(12) United States Patent
Lomayev et al.

(10) Patent No.: US 10,601,549 B2
(45) Date of Patent: Mar. 24, 2020

(54) APPARATUS, SYSTEM AND METHOD OF COMMUNICATING A PHYSICAL LAYER PROTOCOL DATA UNIT (PPDU)

(71) Applicant: INTEL IP CORPORATION, Santa Clara, CA (US)

(72) Inventors: Artyom Lomayev, Nizhny Novgorod (RU); Alexander Maltsev, Nizhny Novgorod (RU); Michael Genossar, Modiin Maccabim-Reut (IL); Claudio Da Silva, Portland, OR (US); Carlos Cordeiro, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 16/132,436

(22) Filed: Sep. 16, 2018

(65) Prior Publication Data

US 2019/0044658 A1 Feb. 7, 2019

Related U.S. Application Data

(60) Provisional application No. 62/576,826, filed on Oct. 25, 2017.

(51) Int. Cl.
*H04W 4/00* (2018.01)
*H04L 1/06* (2006.01)
(Continued)

(52) U.S. Cl.
CPC ......... *H04L 1/0625* (2013.01); *H04B 7/0669* (2013.01); *H04L 1/0618* (2013.01);
(Continued)

(58) Field of Classification Search
None
See application file for complete search history.

(56) References Cited

U.S. PATENT DOCUMENTS 9,860,099 B1 * 1/2018 Noh ............... H04L 27/2602
2011/0075651 A1 * 3/2011 Jia .................. H04B 7/0671
370/344

(Continued)

OTHER PUBLICATIONS

IEEE Std 802.11™-2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

(Continued)

*Primary Examiner* — Bob A Phunkulh
(74) *Attorney, Agent, or Firm* — Shichrur & Co.

(57) ABSTRACT

For example, an EDMG STA may be configured to generate a plurality of spatial streams of an EDMG PPDU; map the plurality of spatial streams to a respective plurality of pairs of space-time streams according to an STBC scheme by mapping a first data sequence of a spatial stream to a first symbol in an odd numbered space-time stream, mapping a second data sequence of the spatial stream to a second symbol in the odd numbered space-time stream, mapping a sign inverted complex conjugate of the second data sequence to a first symbol in an even numbered space-time stream, and mapping a complex conjugate of the first data sequence to a second symbol in the even numbered space-time stream; and transmit a transmission comprising the plurality of pairs of space-time streams over a channel bandwidth in a frequency band above 45 Gigahertz (GHz).

21 Claims, 4 Drawing Sheets

(51) Int. Cl.
    *H04L 5/00*     (2006.01)
    *H04L 27/26*     (2006.01)
    *H04W 72/04*     (2009.01)
    *H04B 7/06*     (2006.01)
    *H04B 7/0413*     (2017.01)

(52) U.S. Cl.
    CPC .......... *H04L 5/0023* (2013.01); *H04L 5/0044* (2013.01); *H04L 5/0048* (2013.01); *H04L 5/0053* (2013.01); *H04L 27/2605* (2013.01); *H04W 72/0453* (2013.01); *H04B 7/0413* (2013.01); *H04L 5/0007* (2013.01)

(56) References Cited

U.S. PATENT DOCUMENTS

| | | | |
|---|---|---|---|
| 2014/0126620 A1* | 5/2014 | Maltsev | H04B 7/0695 375/227 |
| 2015/0311962 A1* | 10/2015 | Maltsev | H04B 7/0669 375/267 |
| 2016/0043855 A1* | 2/2016 | Seok | H04L 5/0055 370/330 |
| 2016/0044635 A1* | 2/2016 | Seok | H04L 69/324 370/312 |
| 2016/0056930 A1* | 2/2016 | Seok | H04L 5/0026 370/330 |
| 2016/0128057 A1* | 5/2016 | Seok | H04L 5/0055 370/329 |
| 2016/0143026 A1* | 5/2016 | Seok | H04W 72/046 370/329 |
| 2016/0212246 A1* | 7/2016 | Seok | H04L 69/323 |
| 2016/0285608 A1* | 9/2016 | Kwon | H04L 5/0055 |
| 2016/0337016 A1* | 11/2016 | Capar | H04B 7/0456 |
| 2018/0262366 A1* | 9/2018 | Sahin | H04B 7/0452 |
| 2019/0124720 A1* | 4/2019 | Kim | H04W 88/02 |

OTHER PUBLICATIONS

Siavash M. Alamouti, "A Simple Transmit Diversity Technique for Wireless Communications", IEEE Journal on Select Areas in Communications, vol. 16, No. 8, Oct. 1998, 8 pages.

* cited by examiner

APPARATUS, SYSTEM AND METHOD OF COMMUNICATING A PHYSICAL LAYER PROTOCOL DATA UNIT (PPDU)

CROSS REFERENCE

This application claims the benefit of and priority from U.S. Provisional Patent Application No. 62/576,826 entitled "Apparatus, System and Method of Communicating a Physical Layer Protocol Data Unit (PPDU)", filed Oct. 25, 2017, the entire disclosure of which is incorporated herein by reference.

TECHNICAL FIELD

Embodiments described herein generally relate to communicating a Physical Layer Protocol Data Unit (PPDU).

BACKGROUND

A wireless communication network in a millimeter-wave band may provide high-speed data access for users of wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
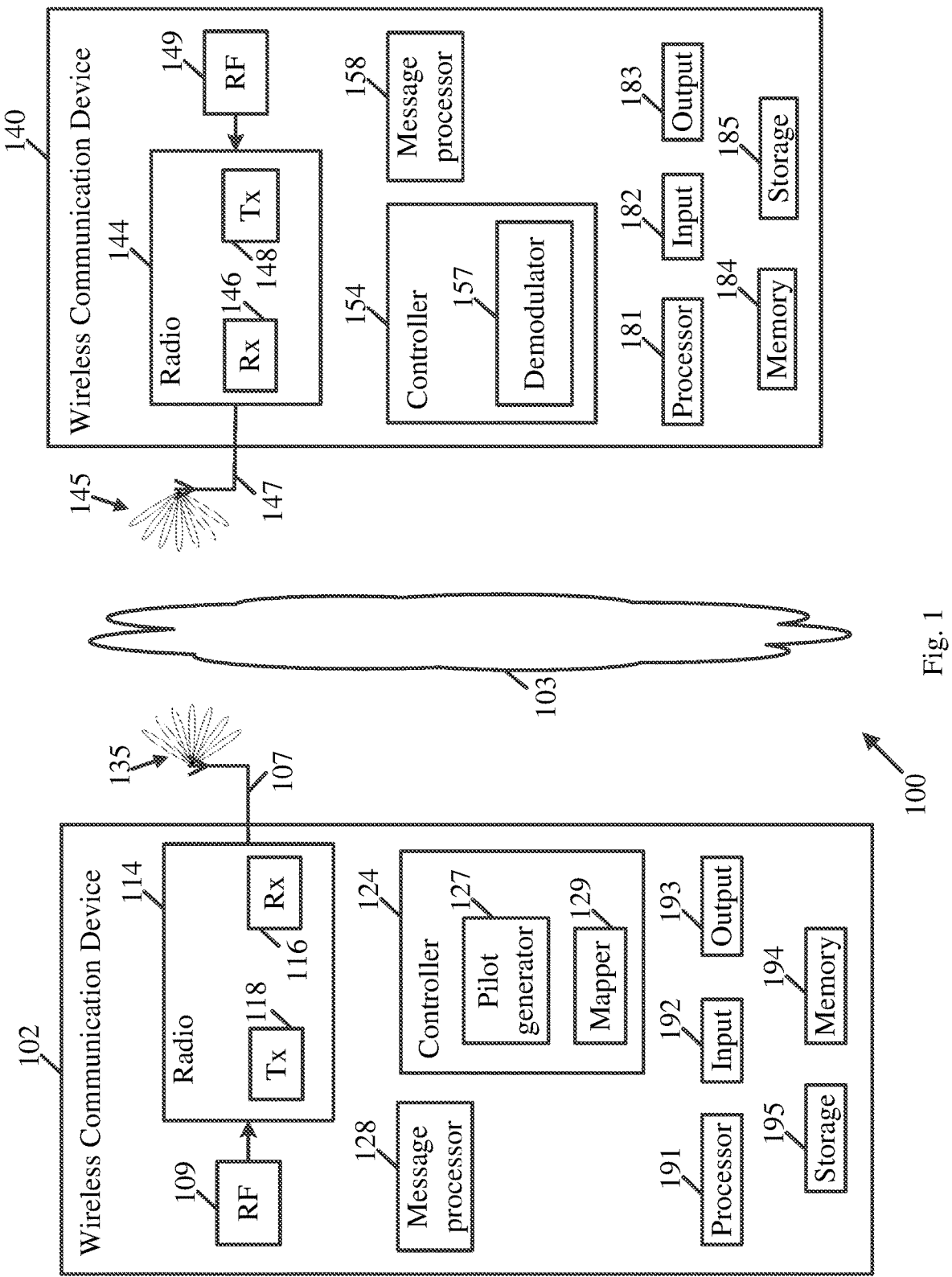
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (*IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7*, 2016); and/or IEEE 802.11ay (P802.11ay/D1.0 *Draft Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications Amendment 7: Enhanced Throughput for Operation in License Exempt Bands Above 45 GHz, November* 2017)) and/or future versions and/or derivatives thereof, devices and/or networks operating in accordance with existing WFA Peer-to-Peer (P2P) specifications (*WiFi P2P technical specification, version 1.7, Jul.* 6, 2016) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version* 1.1, *April* 2011, *Final specification*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band above 45 Gigahertz (GHz), e.g., 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHz, a frequency band above 45 GHz, a 5G frequency band, a frequency band below 20 GHz, e.g., a Sub 1 GHz (S1G) band, a 2.4 GHz band, a 5 GHz band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/ receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., at least 7 Gigabit per second, at least 30 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or one more other devices.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a WiFi channel, a 5G channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments WM 103 may include any other directional channels.

In other embodiments, WM 103 may include any other type of channel over any other frequency band.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, an mmWave band, a 5G band, and/or any other band, for example, a 2.4 GHz band, a 5 GHz band, a S1G band, and/or any other band.

In some demonstrative embodiments, radios 114 and/or 144 may include, or may be associated with one or more, e.g., a plurality of, directional antennas.

In some demonstrative embodiments, device 102 may include one or more, e.g., a plurality of, directional antennas 107, and/or device 140 may include on or more, e.g., a plurality of, directional antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include directional antennas, which may be steered to one or more beam directions. For example, antennas 107 may be steered to one or more beam directions 135, and/or antennas 147 may be steered to one or more beam directions 145.

In some demonstrative embodiments, antennas 107 and/or 147 may include and/or may be implemented as part of a single Phased Antenna Array (PAA).

In some demonstrative embodiments, antennas 107 and/or 147 may be implemented as part of a plurality of PAAs, for example, as a plurality of physically independent PAAs.

In some demonstrative embodiments, a PAA may include, for example, a rectangular geometry, e.g., including an integer number, denoted M, of rows, and an integer number, denoted N, of columns. In other embodiments, any other types of antennas and/or antenna arrays may be used.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, one or more of RF chains 109 may be included as part of, and/or implemented as part of one or more elements of radio 114, e.g., as part of transmitter 118 and/or receiver 116.

In some demonstrative embodiments, device 140 may include one or more, e.g., a plurality of, RF chains 149 connected to, and/or associated with, antennas 147.

In some demonstrative embodiments, one or more of RF chains 149 may be included as part of, and/or implemented as part of one or more elements of radio 144, e.g., as part of transmitter 148 and/or receiver 146.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 128 may be configured to perform any other additional or alternative functionality and/or may include any other additional or alternative components to generate and/or process a message to be transmitted.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 158 may be configured to perform any other additional or alternative functionality and/or may include any other additional or alternative components to generate and/or process a message to be transmitted.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102 and/or device 140 may include, operate as, perform the role of, and/or perform one or more functionalities of, one or more STAs. For example, device 102 may include at least one STA, and/or device 140 may include at least one STA.

In some demonstrative embodiments, device 102 and/or device 140 may include, operate as, perform the role of, and/or perform one or more functionalities of, one or more DMG STAs. For example, device 102 may include, operate as, perform the role of, and/or perform one or more functionalities of, at least one DMG STA, and/or device 140 may include, operate as, perform the role of, and/or perform one or more functionalities of, at least one DMG STA.

In other embodiments, devices 102 and/or 140 may include, operate as, perform the role of, and/or perform one or more functionalities of, any other wireless device and/or station, e.g., a WLAN STA, a WiFi STA, and the like.

In some demonstrative embodiments, device 102 and/or device 140 may be configured operate as, perform the role of, and/or perform one or more functionalities of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, perform the role of, and/or perform one or more functionalities of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments devices 102 and/or 140 may be configured to communicate over a Next Generation 60 GHz (NG60) network, an Enhanced DMG (EDMG) network, and/or any other network. For example, devices 102 and/or 140 may perform Multiple-Input-Multiple-Output (MIMO) communication, for example, for communicating over the NG60 and/or EDMG networks, e.g., over an NG60 or an EDMG frequency band.

In some demonstrative embodiments, devices 102 and/or 140 may be configured to operate in accordance with one or more Specifications, for example, including one or more *IEEE* 802.11 *Specifications*, e.g., an *IEEE* 802.11-2016 *Specification*, an *IEEE* 802.11*ay Specification*, and/or any other specification and/or protocol.

Some demonstrative embodiments may be implemented, for example, as part of a new standard in an mmWave band, e.g., a 60 GHz frequency band or any other directional band, for example, as an evolution of an *IEEE* 802.11-2016 *Specification* and/or an *IEEE* 802.11*ad Specification*.

In some demonstrative embodiments, devices 102 and/or 140 may be configured according to one or more standards, for example, in accordance with an *IEEE* 802.11*ay Standard*, which may be, for example, configured to enhance the efficiency and/or performance of an *IEEE* 802.11*ad Specification*, which may be configured to provide Wi-Fi connectivity in a 60 GHz band.

Some demonstrative embodiments may enable, for example, to significantly increase the data transmission rates defined in the *IEEE* 802.11*ad Specification*, for example, from 7 Gigabit per second (Gbps), e.g., up to 30 Gbps, or to any other data rate, which may, for example, satisfy growing demand in network capacity for new coming applications.

Some demonstrative embodiments may be implemented, for example, to allow increasing a transmission data rate, for example, by applying MIMO and/or channel bonding techniques.

In some demonstrative embodiments, devices 102 and/or 140 may be configured to communicate MIMO communications over the mmWave wireless communication band.

In some demonstrative embodiments, device 102 and/or device 140 may be configured to support one or more mechanisms and/or features, for example, channel bonding, Single User (SU) MIMO, and/or Multi-User (MU) MIMO, for example, in accordance with an *IEEE* 802.11*ay Standard* and/or any other standard and/or protocol.

In some demonstrative embodiments, device 102 and/or device 140 may include, operate as, perform a role of, and/or perform the functionality of, one or more EDMG STAs. For example, device 102 may include, operate as, perform a role of, and/or perform the functionality of, at least one EDMG STA, and/or device 140 may include, operate as, perform a role of, and/or perform the functionality of, at least one EDMG STA.

In some demonstrative embodiments, devices 102 and/or 140 may implement a communication scheme, which may include Physical layer (PHY) and/or Media Access Control (MAC) layer schemes, for example, to support one or more applications, and/or increased transmission data rates, e.g., data rates of up to 30 Gbps, or any other data rate.

In some demonstrative embodiments, the PHY and/or MAC layer schemes may be configured to support frequency channel bonding over a mmWave band, e.g., over a 60 GHz band, SU MIMO techniques, and/or MU MIMO techniques.

In some demonstrative embodiments, devices 102 and/or 140 may be configured to implement one or more mechanisms, which may be configured to enable SU and/or MU communication of Downlink (DL) and/or Uplink frames (UL) using a MIMO scheme.

In some demonstrative embodiments, device 102 and/or device 140 may be configured to implement one or more MU communication mechanisms. For example, devices 102 and/or 140 may be configured to implement one or more MU mechanisms, which may be configured to enable MU communication of DL frames using a MIMO scheme, for example, between a device, e.g., device 102, and a plurality of devices, e.g., including device 140 and/or one or more other devices.

In some demonstrative embodiments, devices 102 and/or 140 may be configured to communicate over an NG60 network, an EDMG network, and/or any other network and/or any other frequency band. For example, devices 102 and/or 140 may be configured to communicate DL MIMO transmissions and/or UL MIMO transmissions, for example, for communicating over the NG60 and/or EDMG networks.

Some wireless communication Specifications, for example, the *IEEE 802.11ad-2012 Specification*, may be configured to support a SU system, in which a STA may transmit frames to a single STA at a time. Such Specifications may not be able, for example, to support a STA transmitting to multiple STAs simultaneously, for example, using a MU-MIMO scheme, e.g., a DL MU-MIMO, or any other MU scheme.

In some demonstrative embodiments, devices 102 and/or 140 may be configured to communicate over a channel bandwidth, e.g., of at least 2.16 GHz, in a frequency band above 45 GHz.

In some demonstrative embodiments, devices 102 and/or 140 may be configured to implement one or more mechanisms, which may, for example, enable to extend a single-channel BW scheme, e.g., a scheme in accordance with the *IEEE 802.11ad Specification* or any other scheme, for higher data rates and/or increased capabilities, e.g., as described below.

In one example, the single-channel BW scheme may include communication over a 2.16 GHz channel (also referred to as a "single-channel" or a "DMG channel").

In some demonstrative embodiments, devices 102 and/or 140 may be configured to implement one or more channel bonding mechanisms, which may, for example, support communication over a channel BW (also referred to as a "wide channel", an "EDMG channel", or a "bonded channel") including two or more channels, e.g., two or more 2.16 GHz channels, e.g., as described below.

In some demonstrative embodiments, the channel bonding mechanisms may include, for example, a mechanism and/or an operation whereby two or more channels, e.g., 2.16 GHz channels, can be combined, e.g., for a higher bandwidth of packet transmission, for example, to enable achieving higher data rates, e.g., when compared to transmissions over a single channel. Some demonstrative embodiments are described herein with respect to communication over a channel BW including two or more 2.16 GHz channels, however other embodiments may be implemented with respect to communications over a channel bandwidth, e.g., a "wide" channel, including or formed by any other number of two or more channels, for example, an aggregated channel including an aggregation of two or more channels.

In some demonstrative embodiments, device 102 and/or device 140 may be configured to implement one or more channel bonding mechanisms, which may, for example, support an increased channel bandwidth, for example, a channel BW of 4.32 GHz, a channel BW of 6.48 GHz, a channel BW of 8.64 GHz, and/or any other additional or alternative channel BW, e.g., as described below.

In some demonstrative embodiments, device 102 and/or device 140 may be configured to implement one or more channel bonding mechanisms, which may, for example, support an increased channel bandwidth, for example, a channel BW of 4.32 GHz, e.g., including two 2.16 Ghz channels according to a channel bonding factor of two, a channel BW of 6.48 GHz, e.g., including three 2.16 Ghz channels according to a channel bonding factor of three, a channel BW of 8.64 GHz, e.g., including four 2.16 Ghz channels according to a channel bonding factor of four, and/or any other additional or alternative channel BW, e.g., including any other number of 2.16 Ghz channels and/or according to any other channel bonding factor.

In some demonstrative embodiments, device 102 and/or device 140 may be configured to communicate one or more transmissions over one or more channel BWs, for example, including a channel BW of 2.16 GHz, a channel BW of 4.32 GHz, a channel BW of 6.48 GHz, a channel BW of 8.64 GHz and/or any other channel BW.

In some demonstrative embodiments, introduction of MIMO may be based, for example, on implementing robust transmission modes and/or enhancing the reliability of data transmission, e.g., rather than the transmission rate, compared to a Single Input Single Output (SISO) case. For example, one or more Space Time Block Coding (STBC) schemes utilizing a space-time channel diversity property may be implemented to achieve one or more enhancements for the MIMO transmission.

In some demonstrative embodiments, devices 102 and/or 140 may be configured to generate, process, transmit and/or receive a Physical Layer (PHY) Protocol Data Unit (PPDU) having a PPDU format (also referred to as "EDMG PPDU format"), which may be configured, for example, for communication between EDMG stations, e.g., as described below.

In some demonstrative embodiments, a PPDU, e.g., an EDMG PPDU, may include at least one non-EDMG fields, e.g., a legacy field, which may be identified, decodable, and/or processed by one or more devices ("non-EDMG devices", or "legacy devices"), which may not support one or more features and/or mechanisms ("non-legacy" mechanisms or "EDMG mechanisms"). For example, the legacy devices may include non-EDMG stations, which may be, for example, configured according to an *IEEE 802.11-2016 Standard*, and the like. For example, a non-EDMG station may include a DMG station, which is not an EDMG station.

Figure 2:
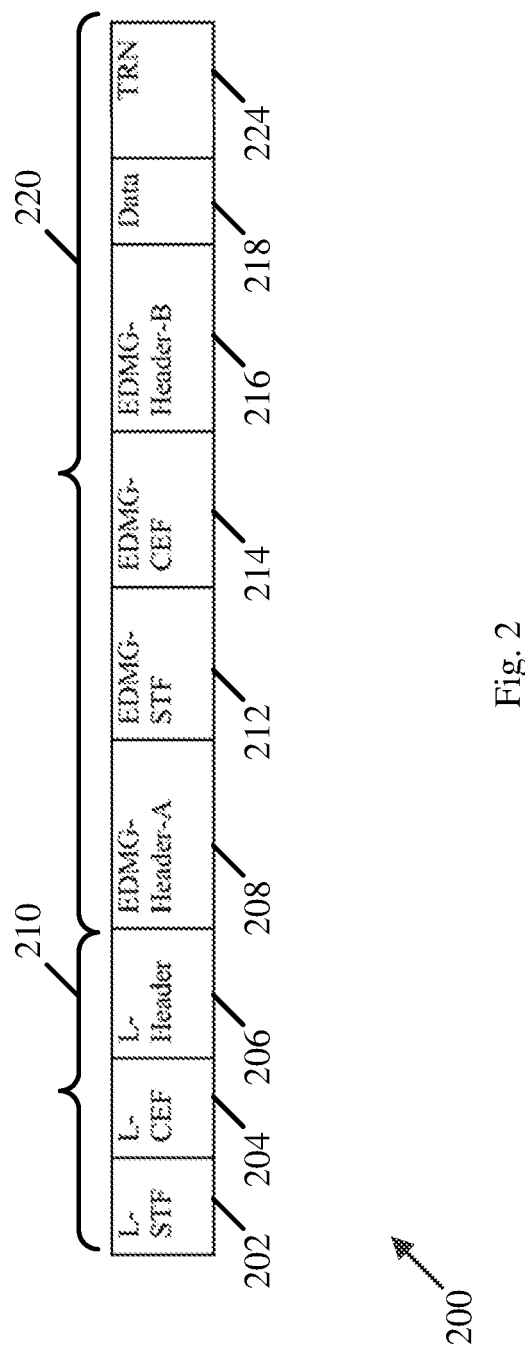
FIG. 2 is a schematic illustration of an Enhanced Directional Multi-Gigabit (EDMG) Physical Layer Protocol Data Unit (PPDU) format, which may be implemented in accordance with some demonstrative embodiments.

Reference is made to FIG. 2, which schematically illustrates an EDMG PPDU format 200, which may be implemented in accordance with some demonstrative embodiments. In one example, devices 102 (FIG. 1) and/or 140 (FIG. 1) may be configured to generate, transmit, receive and/or process one or more EDMG PPDUs having the structure and/or format of EDMG PPDU 200.

In one example, devices 102 (FIG. 1) and/or 140 (FIG. 1) may communicate PPDU 200, for example, as part of a transmission over a channel, e.g., an EDMG channel, having a channel bandwidth including one or more 2.16 GHz channels, for example, including a channel BW of 2.16 GHz, a channel BW of 4.32 GHz, a channel BW of 6.48 GHz, a channel BW of 8.64 GHz, and/or any other channel BW, e.g., as described below.

In some demonstrative embodiments, as shown in FIG. 2, EDMG PPDU 200 may include a non-EDMG portion 210 ("legacy portion"), e.g., as described below.

In some demonstrative embodiments, as shown in FIG. 2, non-EDMG portion 210 may include a non-EDMG (legacy) Short Training Field (STF) (L-STF) 202, a non-EDMG (Legacy) Channel Estimation Field (CEF) (L-CEF) 204, and/or a non-EDMG header (L-header) 206.

In some demonstrative embodiments, as shown in FIG. 2, EDMG PPDU 200, may include an EDMG portion 220, for example, following non-EDMG portion 210, e.g., as described below.

In some demonstrative embodiments, as shown in FIG. 2, EDMG portion 220 may include a first EDMG header, e.g., an EDMG-Header-A 208, an EDMG-STF 212, an EDMG-CEF 214, a second EDMG header, e.g., an EDMG-Header-B 216, a Data field 218, and/or one or more training sequences fields, e.g., a Training (TRN) field 224.

In some demonstrative embodiments, EDMG portion 220 may include some or all of the fields shown in FIG. 2 and/or one or more other additional or alternative fields.

Referring back to FIG. 1, in some demonstrative embodiments, devices 102 and/or 140 may be configured to generate, transmit, receive and/or process one or more transmissions, e.g., including one or more EDMG PPDUs, e.g., as described below.

In some demonstrative embodiments, for example, devices 102 and/or 140 may be configured to perform one or more operations, and/or functionalities of an EDMG STA, which may be configured, for example, to generate, transmit, receive and/or process one or more transmissions, e.g., including one or more EDMG PPDUs, e.g., including one or more fields according to the EDMG PPDU format of FIG. 2.

In some demonstrative embodiments, devices 102 and/or 140 may be configured to generate, transmit, receive and/or process one or more transmissions of PPDUs, for example, EDMG PPDUs, for example, Single Carrier (SC) PPDUs and/or OFDM PPDUs, e.g., in accordance with an *IEEE 802.11ay Specification* and/or any other specification.

In some demonstrative embodiments, devices 102 and/or 140 may be configured to generate, transmit, receive and/or process one or more transmissions of PPDUs, for example, EDMG PPDUs, for example, Single Carrier (SC) PPDUs and/or OFDM PPDUs, according to a channel aggregation scheme, e.g., as described below.

In some demonstrative embodiments, devices 102 and/or 140 may be configured to generate, transmit, receive and/or process an EDMG PPDU communicated over an aggregated channel bandwidth including a plurality of channels, e.g., as described below.

In some demonstrative embodiments, devices 102 and/or 140 may be configured to support communication according to a channel aggregation scheme, for example, supporting the aggregation of two 2.16 GHz channels and/or two 4.32 GHz channels, e.g., as described below.

In other embodiments, any other additional or alternative number of channels, e.g., more than two channels, and/or any other additional or alternative channel widths may be supported for channel aggregation.

In some demonstrative embodiments, devices 102 and/or 140 may be configured to generate, transmit, receive and/or process one or more EDMG PPDUs encoded according to a Space-Time Block Coding (STBC) scheme operating in two or more aggregated frequency channels, e.g., as described below. For example, the STBC may be implemented in two aggregated channels, for example, according to a 2.16+2.16 GHz channel aggregation configuration, and/or a 4.32+4.32 GHz channel aggregation configuration.

In some demonstrative embodiments, the STBC scheme may be implemented with Single Carrier (SC) and/or OFDM modulations, for example, in accordance with an *IEEE 802.11ay Specification*, e.g., as described below.

In some demonstrative embodiments, controller 124 may be configured to cause, trigger, and/or control a wireless station, e.g., an EDMG STA, implemented by device 102 to generate a plurality of spatial streams of an EDMG PHY PPDU, e.g., as described below.

In some demonstrative embodiments, controller 124 may be configured to cause, trigger, and/or control the wireless station implemented by device 102 to map the plurality of spatial streams to a respective plurality of pairs of space-time streams according to an STBC scheme, e.g., as described below.

In some demonstrative embodiments, controller 124 may include, operate as, and/or perform the functionality of a mapper 129, which may be configured to map the plurality of spatial streams to the respective plurality of pairs of space-time streams according to the STBC scheme, for example, by mapping a first data sequence of a spatial stream to a first symbol in an odd numbered space-time stream, mapping a second data sequence of the spatial stream to a second symbol in the odd numbered space-time stream, mapping a sign inverted complex conjugate of the second data sequence to a first symbol in an even numbered space-time stream, and/or mapping a complex conjugate of the first data sequence to a second symbol in the even numbered space-time stream, e.g., as described below.

In some demonstrative embodiments, controller 124 may be configured to cause, trigger, and/or control the wireless station implemented by device 102 to transmit a transmission including the plurality of pairs of space-time streams over a channel bandwidth in a frequency band above 45 GHz, e.g., as described below.

In some demonstrative embodiments, the channel bandwidth may include an aggregated channel bandwidth, e.g., as described below.

In some demonstrative embodiments, the channel bandwidth may include a 2.16+2.16 GHz aggregated channel bandwidth, or a 4.32+4.32 GHz aggregated channel bandwidth, e.g., as described below.

In other embodiments, the channel bandwidth may include any other aggregated channel bandwidth.

In some demonstrative embodiments, controller 124 may be configured to cause, trigger, and/or control the wireless station implemented by device 102 to transmit a first pair of space-time streams over a first channel in the aggregated channel bandwidth, and to transmit a second pair of space-time streams over a second channel in the aggregated channel bandwidth, e.g., as described below.

In some demonstrative embodiments, the first channel may include a 2.16 GHz primary channel, and the second channel may include at least one 2.16 GHz secondary channel, e.g., as described below.

In other embodiments, the first channel and the second channel may include any other channels of any other bandwidth.

In some demonstrative embodiments, the EDMG PPDU may include an EDMG Single User (SU) PPDU, e.g., as described below.

In some demonstrative embodiments, the EDMG PPDU may include an EDMG Multi User (MU) PPDU, e.g., as described below.

In some demonstrative embodiments, the first data sequence of the spatial stream may include a first sequence of data constellation points, and the second data sequence of the spatial stream may include a second sequence of data constellation points subsequent to the first sequence of data constellation points, e.g., as described below.

In some demonstrative embodiments, the second symbol in the odd numbered space-time stream may be subsequent to the first symbol in the odd numbered space-time stream, and the second symbol in the even numbered space-time stream may be subsequent to the first symbol in the even numbered space-time stream, e.g., as described below.

In some demonstrative embodiments, mapper 129 may be configured to map a first data sequence of a first spatial stream to a first symbol in a first odd numbered space-time stream, and to map a second data sequence of the first spatial stream to a second symbol in the first odd numbered space-time stream, e.g., as described below.

In some demonstrative embodiments, mapper 129 may be configured to map a sign inverted complex conjugate of the second data sequence of the first spatial stream to a first symbol in a first even numbered space-time stream, and to map a complex conjugate of the first data sequence of the first spatial stream to a second symbol in the first even numbered space-time stream, e.g., as described below.

In some demonstrative embodiments, mapper 129 may be configured to map a first data sequence of a second spatial stream to a first symbol in a second odd numbered space-time stream, and to map a second data sequence of the second spatial stream to a second symbol in the second odd numbered space-time stream, e.g., as described below.

In some demonstrative embodiments, mapper 129 may be configured to map a sign inverted complex conjugate of the second data sequence of the second spatial stream to a first symbol in a second even numbered space-time stream, and to map a complex conjugate of the first data sequence of the second spatial stream to a second symbol in the second even numbered space-time stream, e.g., as described below.

In some demonstrative embodiments, devices 102 and/or 140 may be configured to generate, transmit, receive and/or process one or more transmissions according to a space-time coding, for example, an STBC SC scheme, e.g., as described below.

In some demonstrative embodiments, devices 102 and/or 140 may be configured to generate, transmit, receive and/or process a SC transmission of the EDMG PPDU, for example, EDMG PPDU 200 (FIG. 2), e.g., as described below.

In some demonstrative embodiments, devices 102 and/or 140 may be configured to generate, transmit, receive and/or process one or more EDMG PPDUs according to an STBC scheme for SC PHY, e.g., as described below.

In some demonstrative embodiments, for example, for 2.16 GHz, 4.32 GHz, 6.48 GHz, and/or 8.64 GHz channel configurations, the STBC may be configured to perform a mapping of a single spatial stream to two space-time streams.

In some demonstrative embodiments, for example, for an aggregated channel bandwidth, for example, for 2.16+2.16 GHz and/or 4.32+4.32 GHz channel configurations, the STBC may be configured to perform a mapping of two spatial streams to four space-time streams, e.g., as described below.

In some demonstrative embodiments, a first spatial stream may be assigned to a channel containing a 2.16 GHz primary channel. The first spatial stream may be mapped to corresponding first and second space-time streams, which may be assigned to the channel containing the 2.16 GHz primary channel, e.g., as described below.

In some demonstrative embodiments, a second spatial stream may be assigned to a channel containing 2.16 GHz secondary channels. The second spatial stream may be mapped to corresponding third and fourth space-time streams, which may be assigned to the channel containing the 2.16 GHz secondary channels, e.g., as described below.

In some demonstrative embodiments, for example, device 102 may be configured to generate first and second spatial streams of a PPDU to be communicated in a SC transmission over an aggregated channel including first and second channels over a frequency band above 45 GHz, e.g., as described below.

In some demonstrative embodiments, for example, device 102 may be configured to map the first and second spatial streams to four space-time streams according to an STBC scheme, e.g., as described below.

In some demonstrative embodiments, for example, device 102 may be configured to transmit the four space-time streams over the aggregated channel bandwidth, e.g., as described below.

In some demonstrative embodiments, for example, device 102 may be configured to map the first spatial stream to first and second space-time streams, e.g., as described below.

In some demonstrative embodiments, for example, device 102 may be configured to map the second spatial stream to third and fourth space-time streams, e.g., as described below.

In some demonstrative embodiments, for example, device 102 may be configured to transmit the first and second space-time streams over the first channel of the aggregated channel bandwidth, e.g., as described below.

In some demonstrative embodiments, for example, device 102 may be configured to transmit the third and fourth space-time streams over the second channel of the aggregated channel bandwidth, e.g., as described below.

In some demonstrative embodiments, for example, when the transmission includes a SC transmission, the first data sequence may include a first data symbol block including, for example, a first sequence of data constellation points, and/or the second data sequence may include a second data symbol block including, for example, a second sequence of data constellation points, e.g., as described below.

In some demonstrative embodiments, mapper 129 may be configured to, for example, map a complex conjugate of a first inverted data symbol block to the second symbol in the even numbered space-time stream, and to map a sign inverted complex conjugate of a second inverted data symbol block to the first symbol in the even numbered space-time stream, e.g., as described below.

In some demonstrative embodiments, the first inverted data symbol block may include the first data symbol block with inverted symbol order, and/or the second inverted data symbol block may include the second data symbol block with inverted symbol order, e.g., as described below.

In some demonstrative embodiments, mapper 129 may be configured to map first and second spatial streams to first and second pairs of space-time streams, for example, at a SC transmission mode, e.g., as follows:

$$s^{iSTS=1} = (d^{(i_{ss}=1,0)}, d^{(i_{ss}=1,1)}, d^{(i_{ss}=1,2)}, \quad (1)$$
$$d^{(i_{ss}=1,3)}, \ldots, d^{(i_{ss}=1,N_{BLKS}-2)}, d^{(i_{ss}=1,N_{BLKS}-1)})$$

$$s^{iSTS=2} =$$

-continued $$s^{i_{STS}=3} = \begin{pmatrix} -conj(d_{inv}^{(i_{ss}=1,1)}), conj(d_{inv}^{(i_{ss}=1,0)}), -conj(d_{inv}^{(i_{ss}=1,3)}), \\ conj(d_{inv}^{(i_{ss}=1,2)}), \ldots, -conj(d_{inv}^{(i_{ss}=1,N_{BLKS}-1)}), conj(d_{inv}^{(i_{ss}=1,N_{BLKS}-2)}) \end{pmatrix}$$

$$s^{i_{STS}=3} = (d^{(i_{ss}=2,0)}, d^{(i_{ss}=2,1)}, d^{(i_{ss}=2,2)}, d^{(i_{ss}=2,3)},$$
$$\ldots, d^{(i_{ss}=2,N_{BLKS}-2)}, d^{(i_{ss}=2,N_{BLKS}-1)})$$

$$s^{i_{STS}=4} =$$
$$\begin{pmatrix} -conj(d_{inv}^{(i_{ss}=2,1)}), conj(d_{inv}^{(i_{ss}=2,0)}), -conj(d_{inv}^{(i_{ss}=2,3)}), \\ conj(d_{inv}^{(i_{ss}=2,2)}), \ldots, -conj(d_{inv}^{(i_{ss}=2,N_{BLKS}-1)}), conj(d_{inv}^{(i_{ss}=2,N_{BLKS}-2)}) \end{pmatrix}$$

wherein:

$s^{i_{STS}}$ denotes modulated data symbols for a space-time stream with a space-time stream index $i_{sts}$, $i_{SS}$ denotes a spatial stream index;

$d^{(i_{ss},q)}$ denotes a data symbol block with an index q in a spatial stream with the index $i_{SS}$;

$d_{inv}^{(i_{ss},q)}$ denotes the data symbol block $d^{(i_{ss},q)}$ with inverted symbol order; and $N_{BLKS}$ denotes a count of data symbol blocks.

In some demonstrative embodiments, device 102 may be configured to implement an STBC scheme for SC PHY to perform STBC encoding, e.g., as follows:

a) The input encoded bits of $i_{SS}$-th spatial stream are broken into the groups of $N_{CBPB} \times N_{CB}$ bits–($c_0^{(i_{ss},q)}$, $c_1^{(i_{ss},q)}$, ..., $c_{N_{CBPB} \times N_{CB}-1}^{(i_{ss},q)}$), where q denotes a group number. The STBC applies an encoding procedure, for example, in accordance with an *IEEE 802.11ay Specification*, e.g., as defined in Section 30.5.8.4.3. The padding procedure requires that the total number of groups of $N_{CBPB} \times N_{CB}$ bits shall be an even number.

b) Each group of bits ($c_{N_{CBPS} \cdot k}^{(i_{ss},q)}$, $c_{N_{CBPS} \cdot k+1}^{(i_{ss},q)}$, ..., $c_{N_{CBPS} \cdot k+N_{CBPS}-1}^{(i_{ss},q)}$), $i_{SS}=1, \ldots, N_{SS}$ ($N_{SS}=1$ or 2), $k=0, 1, \ldots, N_{SPB} \times N_{CB}-1$, $q=0, 1, \ldots, N_{BLKS}-1$ is converted to the constellation point $d_k^{(i_{ss},q)}$, for example, following one or more rules, for example, in accordance with an *IEEE 802.11ay Specification*, e.g., as defined in Section 20.6.3.2.4.

c) STBC operates with symbol blocks $d^{(i_{ss},q)}=(d_0^{(i_{ss},q)}, d_1^{(i_{ss},q)}, \ldots, d_{N_{SPB} \times N_{CB}-1}^{(i_{ss},q)})$ and with blocks with inverted symbols order $d_{inv}^{(i_{ss},q)}=(d_{N_{SPB} \times N_{CB}-1}^{(i_{ss},q)}, d_{N_{SPB} \times N_{CB}-1}^{(i_{ss},q)}, \ldots, d_0^{(i_{ss},q)})$.

d) For 2.16 GHz, 4.32 GHz, 6.48 GHz, and 8.64 GHz channel configurations, a single spatial stream ($N_{SS}=1$) is mapped to the two space-time streams ($N_{STS}=2$), e.g., as follows:

a. Modulated data for the first space-time stream:

$$s^{i_{STS}=1}=(d^{(i_{ss}=1,0)}, d^{(i_{ss}=1,1)}, d^{(i_{ss}=1,2)}, d^{(i_{ss}=1,3)}, \ldots, d^{(i_{ss}=1,N_{BLKS}-2)}, d^{(i_{ss}=1,N_{BLKS}-1)})$$

b. Modulated data for the second space-time stream:

$$s^{i_{STS}=2} = \begin{pmatrix} -conj(d_{inv}^{(i_{ss}=1,1)}), conj(d_{inv}^{(i_{ss}=1,0)}), -conj(d_{inv}^{(i_{ss}=1,3)}), conj(d_{inv}^{(i_{ss}=1,2)}), \ldots, \\ -conj(d_{inv}^{(i_{ss}=1,N_{BLKS}-1)}), \ldots, conj(d_{inv}^{(i_{ss}=1,N_{BLKS}-2)}) \end{pmatrix}$$

e) For 2.16+2.16 GHz and 4.32+4.32 GHz channel configurations, two spatial streams ($N_{SS}=2$) are mapped to the four space-time streams ($N_{STS}=4$), e.g., as follows:

a. Modulated data for the first space-time stream:

$$s^{i_{STS}=1}=(d^{(i_{ss}=1,0)}, d^{(i_{ss}=1,1)}, d^{(i_{ss}=1,2)}, d^{(i_{ss}=1,3)}, \ldots, d^{(i_{ss}=1,N_{BLKS}-2)}, d^{(i_{ss}=1,N_{BLKS}-1)})$$

b. Modulated data for the second space-time stream:

$$s^{i_{STS}=2} = \begin{pmatrix} -conj(d_{inv}^{(i_{ss}=1,1)}), conj(d_{inv}^{(i_{ss}=1,0)}), -conj(d_{inv}^{(i_{ss}=1,3)}), conj(d_{inv}^{(i_{ss}=1,2)}), \ldots, \\ -conj(d_{inv}^{(i_{ss}=1,N_{BLKS}-1)}), \ldots, conj(d_{inv}^{(i_{ss}=1,N_{BLKS}-2)}) \end{pmatrix}$$

c. Modulated data for the third space-time stream:

$$s^{i_{STS}=3}=(d^{(i_{ss}=2,0)}, d^{(i_{ss}=2,1)}, d^{(i_{ss}=2,2)}, d^{(i_{ss}=2,3)}, \ldots, d^{(i_{ss}=2,N_{BLKS}-2)}, d^{(i_{ss}=2,N_{BLKS}-1)})$$

d. Modulated data for the fourth space-time stream:

$$s^{i_{STS}=4} = \begin{pmatrix} -conj(d_{inv}^{(i_{ss}=2,1)}), conj(d_{inv}^{(i_{ss}=2,0)}), -conj(d_{inv}^{(i_{ss}=2,3)}), conj(d_{inv}^{(i_{ss}=2,2)}), \ldots, \\ -conj(d_{inv}^{(i_{ss}=2,N_{BLKS}-1)}), \ldots, conj(d_{inv}^{(i_{ss}=2,N_{BLKS}-2)}) \end{pmatrix}$$

f) STBC may use, for example, the same symbol blocking structure defined for SU PPDU and/or MU PPDU, for example, in accordance with an *IEEE 802.11ay Specification*, e.g., as defined in Sections 30.5.8.2.2.3 and/or 30.5.8.2.4, respectively.

In some demonstrative embodiments, device 102 may be configured to encode a SC EDMG PPDU according to an STBC encoding procedure including some or all of the operations of the SC STBC encoding procedure described above and/or one or more additional or alternative operations, parameters, and/or procedures.

In some demonstrative embodiments, devices 102 and/or 140 may be configured to generate, transmit, receive and/or process one or more transmissions according to an STBC OFDM scheme, e.g., as described below.

In some demonstrative embodiments, devices 102 and/or 140 may be configured to generate, transmit, receive and/or process one or more EDMG PPDUs according to an STBC scheme for OFDM PHY, e.g., as described above.

In some demonstrative embodiments, for example, for 2.16 GHz, 4.32 GHz, 6.48 GHz, and/or 8.64 GHz channel configurations, the STBC may be configured to perform a mapping of a single spatial stream to two space-time streams.

In some demonstrative embodiments, for example, for an aggregated channel bandwidth, for example, for 2.16+2.16 GHz and/or 4.32+4.32 GHz channel configurations, the STBC may be configured to perform a mapping of two spatial streams to four space-time streams, e.g., as described below.

In some demonstrative embodiments, a first spatial stream may be assigned to a channel containing a 2.16 GHz primary channel. The first spatial stream may be mapped to corresponding first and second space-time streams, which may be assigned to the channel containing the 2.16 GHz primary channel, e.g., as described below.

In some demonstrative embodiments, a second spatial stream may be assigned to a channel containing 2.16 GHz secondary channels. The second spatial stream may be mapped to corresponding third and fourth space-time streams, which may be assigned to the channel containing the 2.16 GHz secondary channels, e.g., as described below.

In some demonstrative embodiments, for example, device 102 may be configured to generate first and second spatial streams of a PPDU to be communicated in an OFDM transmission over an aggregated channel including at least first and second channels over a frequency band above 45 GHz, e.g., as described below.

In some demonstrative embodiments, for example, device 102 may be configured to map the first and second spatial streams to four space-time streams according to an STBC scheme, e.g., as described below.

In some demonstrative embodiments, for example, device 102 may be configured to transmit the four space-time streams over the aggregated channel bandwidth, e.g., as described below.

In some demonstrative embodiments, for example, device 102 may be configured to map the first spatial stream to first and second space-time streams, e.g., as described below.

In some demonstrative embodiments, for example, device 102 may be configured to map the second spatial stream to third and fourth space-time streams, e.g., as described below.

In some demonstrative embodiments, for example, device 102 may be configured to transmit the first and second space-time streams over the first channel of the aggregated channel bandwidth, e.g., as described below.

In some demonstrative embodiments, for example, device 102 may be configured to transmit the third and fourth space-time streams over the second channel of the aggregated channel bandwidth, e.g., as described below.

In some demonstrative embodiments, devices 102 and/or 140 may be configured to generate, transmit, receive and/or process the transmission including an OFDM transmission, e.g., as describes below.

In some demonstrative embodiments, when the transmission includes the OFDM transmission, the first data sequence may include a first sequence of data constellation points, and the second data sequence may include a second sequence of data constellation points, e.g., as described below.

In some demonstrative embodiments, mapper 129 may be configured to map the first sequence of data constellation points to a plurality of data subcarriers of a first OFDM symbol in the odd numbered space-time stream, and to map the second sequence of data constellation points to a plurality of data subcarriers of a second OFDM symbol in the odd numbered space-time stream, e.g., as describes below.

In some demonstrative embodiments, mapper 129 may be configured to map a sign inverted complex conjugate of the second sequence of data constellation points to the plurality of subcarriers of the first OFDM symbol in the even numbered space-time stream, and to map a complex conjugate of the first sequence of data constellation points to the plurality of subcarriers of the second OFDM symbol in the even numbered space-time stream, e.g., as describes below.

In some demonstrative embodiments, mapper 129 may be configured to map first and second spatial streams to first and second pairs of space-time streams, for example, at an OFDM transmission mode, e.g., as follows:

$$D(i_{STS}=1,2n,M_d(k))=d(i_{SS}=1,2n,k)$$

$$D(i_{STS}=1,2n+1,M_d(k))=d(i_{SS}=1,2n+1,k)$$

$$D(i_{STS}=2,2n,M_d(k))=-\mathrm{conj}(d(i_{SS}=1,2n+1,k))$$

$$D(i_{STS}=2,2n+1,M_d(k))=\mathrm{conj}(d(i_{SS}=1,2n,k))$$

$$D(i_{STS}=3,2n,M_d(k))=d(i_{SS}=2,2n,k)$$

$$D(i_{STS}=3,2n+1,M_d(k))=d(i_{SS}=2,2n+1,k)$$

$$D(i_{STS}=4,2n,M_d(k))=-\mathrm{conj}(d(i_{SS}=2,2n+1,k))$$

$$D(i_{STS}=4,2n+1,M_d(k))=\mathrm{conj}(d(i_{SS}=2,2n,k)) \qquad (2)$$

wherein:

$i_{SS}$ denotes a spatial stream index;

n=0, 1, . . . , $N_{SYM}/2-1$, $N_{SYM}$ denotes a number of symbols;

k=0, 1, $N_{SD}-1$, $N_{SD}$ denotes a number of data subcarriers;

$d(i_{SS},q,k)$ denotes a data constellation point for a q-th symbol and a k-th data tone for the spatial stream index $i_{ss}$; and $D(i_{SS},q,M_d(k))$ denotes an element in a modulated data sequence for a space-time stream index $i_{sts}$ corresponding to the q-th symbol and a k-th modulated data tone Md(k).

In some demonstrative embodiments, devices 102 and/or 140 may be configured to utilize an OFDM pilot structure, which may be configured to support the OFDM transmission with the space-time encoding scheme, for example, the STBC scheme, e.g., as described below.

In some demonstrative embodiments, controller 124 may include, operate as, and/or perform the functionality of a pilot sequence generator 127, which may be configured to generate a plurality of pilot sequences to be mapped to the plurality of the pairs of spatial streams, e.g., as described below. For example, pilot sequence generator 127 may be configured to generate the plurality of pilot sequences utilizing a random generator (scrambler) and/or any other additional or alternative generator.

In some demonstrative embodiments, pilot sequence generator 127 may be configured to generate a pilot sequence having an index n, for example, by applying to a predefined pilot sequence, denoted P, a function, which is based on a value of n.

In some demonstrative embodiments, pilot sequence generator 127 may be configured to generate the pilot sequence having the index n, for example, by multiplying the pilot sequence P by the value $2 \times p_n - 1$.

For example, a pilot sequence having an index n, which may be applied to an OFDM symbol with the index n, may be generated, for example, by multiplying the pilot sequence P by the value of $2 \times p_n - 1$. For example, the value of $p_n$ may be determined by the random generator.

In some demonstrative embodiments, mapper 129 may be configured to map a plurality of pilot sequences, e.g., including the plurality of pilot sequences generated by pilot sequence generator 127, to the plurality of pairs of space-time streams, e.g., as described below.

In some demonstrative embodiments, mapper 129 may be configured to map a first pilot sequence to a plurality of pilot subcarriers of the first OFDM symbol in the odd numbered space-time stream, and/or to map a second pilot sequence to a plurality of pilot subcarriers of the second OFDM symbol in the odd numbered space-time stream, e.g., as described below.

In some demonstrative embodiments, mapper 129 may be configured to map a sign inversion of the second pilot sequence to the plurality of pilot subcarriers of the first OFDM symbol in the even numbered space-time stream, and/or to map the first pilot sequence to the plurality of pilot subcarriers of the second OFDM symbol in the even numbered space-time stream, e.g., as described below.

In some demonstrative embodiments, mapper 129 may be configured to map the first and second pilot sequences to first and second pairs of space-time streams, e.g., as follows:

$$P(i_{STS}=1,2n,M_p(k))=P_{N_{SP}}(i_{STS}=1,k) \cdot (2p(2n)-1)$$

$$P(i_{STS}=1,2n+1,M_p(k))=P_{N_{SP}}(i_{STS}=2,k) \cdot (2p(2n+1)-1)$$

$$P(i_{STS}=2,2n,M_p(k))=-P_{N_{SP}}(i_{STS}=2,k) \cdot (2p(2n)-1)$$

$P(i_{STS}=2,2n+1,M_p(k))=P_{NSP}(i_{STS}=1,k)\cdot(2p(2n+1)-1)$ $P(i_{STS}=3,2n,M_p(k))=P_{NSP}(i_{STS}=1,k)\cdot(2p(2n)-1)$ $P(i_{STS}=3,2n+1,M_p(k))=P_{NSP}(i_{STS}=2,k)\cdot(2p(2n+1)-1)$ $P(i_{STS}=4,2n,M_p(k))=-P_{NSP}(i_{STS}=2,k)\cdot(2p(2n)-1)$ $P(i_{STS}=4,2n+1,M_p(k))=P_{NSP}(i_{STS}=1,k)\cdot(2p(2n+1)-1)$ (3)

wherein:
$i_{SS}$ denotes a spatial stream index;
n=0, 1, . . . , $N_{SYM}/2-1$, $N_{SYM}$ denotes a number of symbols;
k=0, 1, . . . , $N_{SP}-1$, $N_{SP}$ denotes a number of pilot subcarriers;
$P_{NSP}(i_{STS}, k)$ denotes a pilot sequence for a space-time stream index $i_{sts}$;
p(n) denotes an n-th scrambler bit; and
$P(i_{STS},q,M_p(k))$ denotes an element in a modulated pilot sequence for the space-time stream index $i_{sts}$ corresponding to the q-th symbol and a k-th modulated pilot tone Mp(k).

In some demonstrative embodiments, device 102 may be configured to implement an STBC scheme for OFDM PHY to perform STBC encoding, e.g., as follows:

a) The input bits of $i_{SS}$-th spatial stream are broken into the groups of $N_{CBPS}$ bits, $(c_0^{(iss,q)}, c_1^{(iss,q)}, \ldots, c_{N_{CBPS}-1}^{(iss,q)})$, where q denotes group number. The STBC applies an encoding procedure, for example, in accordance with an *IEEE 802.11ay Specification*, e.g., as defined in Section 30.6.6. The padding procedure requires that the total number of groups of $N_{CBPS}$ bits shall be an even number.

b) Each group of bits $(c_{N_{BPSC}\cdot k}^{(iss,q)}, c_{N_{BPSC}\cdot k+1}^{(iss,q)}, \ldots, c_{N_{BPSC}\cdot k+N_{BPSC}-1}^{(iss,q)})$, $i_{SS}=1,\ldots,N_{SS}$ ($N_{SS}=1$ or 2), k=0, 1, . . . , $N_{SC}-1$, q=0, 1, . . . , $N_{SYMS}-1$ is converted to the constellation point $d(i_{SS},q,k)$, following one or more rules, for example, in accordance with an *IEEE 802.11ay Specification*, e.g., as defined in Section 20.5.3.2.4.

c) For 2.16 GHz, 4.32 GHz, 6.48 GHz, and 8.64 GHz channel configurations, a single spatial stream ($N_{SS}=1$) is mapped to the two space-time streams ($N_{STS}=2$), e.g., as follows:

a. Modulated data sequence for the first space-time stream is defined by inserting zeros from $-N_{SR}$ to $N_{SR}$ and then inserting data at tones $M_d(k)$, for example, in accordance with an *IEEE 802.11ay Specification*, e.g., as defined in Section 30.6.1.5, for example, as follows:

$D(i_{STS}=1,2n,M_d(k))=d(i_{SS}=1,2n,k)$, $D(i_{STS}=1,2n+1,M_d(k))=d(i_{SS}=1,2n+1,k),k=0,1,\ldots,N_{SD}-1$ b. Modulated data sequence for the second space-time stream is defined by inserting zeros from $-N_{SR}$ to $N_{SR}$ and then inserting data at tones $M_d(k)$, for example, in accordance with an *IEEE 802.11ay Specification*, e.g., as defined in Section 30.6.1.5, for example, as follows:

$D(i_{STS}=2,2n,M_d(k))=-\text{conj}(d(i_{SS}=1,2n+1,k))$, $D(i_{STS}=2,2n+1,M_d(k))=\text{conj}(d(i_{SS}=1,2n,k)),k=0,1,\ldots,N_{SD}-1$ c. The modulated pilot sequence for the first space-time stream is defined by inserting zeros from $-N_{SR}$ to $N_{SR}$ and then inserting pilots at tones $M_p(k)$, for example, in accordance with an *IEEE 802.11ay Specification*, e.g., as defined in Section 30.6.1.4, for example, as follows:

$P(i_{STS}=1,2n,M_p(k))=P_{NSP}(i_{STS}=1,k)\cdot(2p(2n)-1)$, $P(i_{STS}=1,2n+1,M_p(k))=P_{NSP}(i_{STS}=2,k)\cdot(2p(2n+1)-1)$,
k=0,1, . . . ,$N_{SP}-1$ d. The modulated pilot sequence for the second space-time stream is defined by inserting zeros from $-N_{SR}$ to $N_{SR}$ and then inserting data at tones $M_p(k)$, for example, in accordance with an *IEEE 802.11ay Specification*, e.g., as defined in Section 30.6.1.4, for example, as follows:

$P(i_{STS}=2,2n,M_p(k))=-P_{NSP}(i_{STS}=2,k)\cdot(2p(2n)-1)$, $P(i_{STS}=2,2n+1,M_p(k))=P_{NSP}(i_{STS}=1,k)\cdot(2p(2n+1)-1)$,
k=0,1, . . . ,$N_{SP}-1$ d) For 2.16+2.16 GHz and 4.32+4.32 GHz channel configurations, two spatial streams ($N_{SS}=2$) are mapped to the four space-time streams ($N_{STS}=4$), e.g., as follows:

a. Modulated data sequence for the first space-time stream is defined by inserting zeros from $-N_{SR}$ to $N_{SR}$ and then inserting data at tones $M_d(k)$, for example, in accordance with an *IEEE 802.11ay Specification*, e.g., as defined in Section 30.6.1.5, for example, as follows:

$D(i_{STS}=1,2n,M_d(k))=d(i_{SS}=1,2n,k)$, $D(i_{STS}=1,2n+1,M_d(k))=d(i_{SS}=1,2n+1,k),k=0,1,\ldots,N_{SD}-1$ b. Modulated data sequence for the second space-time stream is defined by inserting zeros from $-N_{SR}$ to $N_{SR}$ and then inserting data at tones $M_d(k)$, for example, in accordance with an *IEEE 802.11ay Specification*, e.g., as defined in Section 30.6.1.5, for example, as follows:

$D(i_{STS}=2,2n,M_d(k))=-\text{conj}(d(i_{SS}=1,2n+1,k))$, $D(i_{STS}=2,2n+1,M_d(k))=\text{conj}(d(i_{SS}=1,2n,k)),k=0,1,\ldots,N_{SD}-1$ c. Modulated data sequence for the third space-time stream is defined by inserting zeros from $-N_{SR}$ to $N_{SR}$ and then inserting data at tones $M_d(k)$, for example, in accordance with an *IEEE 802.11ay Specification*, e.g., as defined in Section 30.6.1.5, for example, as follows:

$D(i_{STS}=3,2n,M_d(k))=d(i_{SS}=2,2n,k)$, $D(i_{STS}=3,2n+1,M_d(k))=d(i_{SS}=2,2n+1,k),k=0,1,\ldots,N_{SD}-1$ d. Modulated data sequence for the fourth space-time stream is defined by inserting zeros from $-N_{SR}$ to $N_{SR}$ and then inserting data at tones $M_d(k)$), for example, in accordance with an *IEEE 802.11ay Specification*, e.g., as defined in Section 30.6.1.5, for example, as follows:

$D(i_{STS}=4,2n,M_d(k))=-\text{conj}(d(i_{SS}=2,2n+1,k))$, $D(i_{STS}=4,2n+1,M_d(k))=\text{conj}(d(i_{SS}=2,2n,k)),k=0,1,\ldots,N_{SD}-1$ e. The modulated pilot sequence for the first space-time stream is defined by inserting zeros from $-N_{SR}$ to $N_{SR}$ and then inserting pilots at tones $M_p(k)$, for example, in accordance with an *IEEE* 802.11*ay* Specification, e.g., as defined in Section 30.6.1.4, for example, as follows:

$$P(i_{STS}=1,2n,M_p(k))=P_{NSP}(i_{STS}=1,k)\cdot(2p(2n)-1),$$

$$P(i_{STS}=1,2n+1,M_p(k))=P_{NSP}(i_{STS}=2,k)\cdot(2p(2n+1)-1),$$
$$k=0,1,\ldots,N_{SP}-1$$

f. The modulated pilot sequence for the second space-time stream is defined by inserting zeros from $-N_{SR}$ to $N_{SR}$ and then inserting data at tones $M_p(k)$, for example, in accordance with an *IEEE* 802.11*ay* Specification, e.g., as defined in Section 30.6.1.4, for example, as follows:

$$P(i_{STS}=2,2n,M_p(k))=-P_{NSP}(i_{STS}=2,k)\cdot(2p(2n)-1),$$

$$P(i_{STS}=2,2n+1,M_p(k))=P_{NSP}(i_{STS}=1,k)\cdot(2p(2n+1)-1),$$
$$k=0,1,\ldots,N_{SP}-1$$

g. The modulated pilot sequence for the third space-time stream is defined by inserting zeros from $-N_{SR}$ to $N_{SR}$ and then inserting pilots at tones $M_p(k)$, for example, in accordance with an *IEEE* 802.11*ay* Specification, e.g., as defined in Section 30.6.1.4, for example, as follows:

$$P(i_{STS}=3,2n,M_p(k))=P_{NSP}(i_{STS}=1,k)\cdot(2p(2n)-1),$$

$$P(i_{STS}=3,2n+1,M_p(k))=P_{NSP}(i_{STS}=2,k)\cdot(2p(2n+1)-1),$$
$$k=0,1,\ldots,N_{SP}-1$$

h. The modulated pilot sequence for the fourth space-time stream is defined by inserting zeros from $-N_{SR}$ to $N_{SR}$ and then inserting data at tones $M_p(k)$, for example, in accordance with an *IEEE* 802.11*ay* Specification, e.g., as defined in Section 30.6.1.4, for example, as follows:

$$P(i_{STS}=4,2n,M_p(k))=-P_{NSP}(i_{STS}=2,k)\cdot(2p(2n)-1),$$

$$P(i_{STS}=4,2n+1,M_p(k))=P_{NSP}(i_{STS}=1,k)\cdot(2p(2n+1)-1),$$
$$k=0,1,\ldots N_{SP}-1$$

where the index $n=0, 1, \ldots, N_{SYM}/2-1$; pilot sequences $P_{NSP}(i_{STS}=1, k)$ and $P_{NSP}(i_{STS}=2, k)$ may be defined, for example, in accordance with an *IEEE* 802.11*ay* Specification, e.g., as defined in Section in Section 30.6.1.6; and/or $p(n)$ defines a bit coming from the scrambler, for example, in accordance with an *IEEE* 802.11*ay* Specification, e.g., as defined in Section 20.5.3.2.2, for example, with shift register $x_1, x_2, \ldots, x_7$ initialized to all ones for the n=0 OFDM symbol.

For example, for SQPSK and/or QPSK modulations, STBC shall apply Static Tone Pairing (STP) subcarriers mapping.

In some demonstrative embodiments, device 102 may be configured to encode an OFDM EDMG PPDU according to an STBC encoding procedure including some or all of the operations of the OFDM STBC encoding procedure described above and/or one or more additional or alternative operations, parameters, and/or procedures.

In some demonstrative embodiments, device 140 may be configured to receive the transmission from device 102 and to decode the transmission according to the STBC scheme described above.

For example, controller 154 may include, operate as, and/or perform the functionality of a demodulator 157, which may be configured to process the plurality of spatial streams to demodulate the OFDM transmission.

Figure 3:
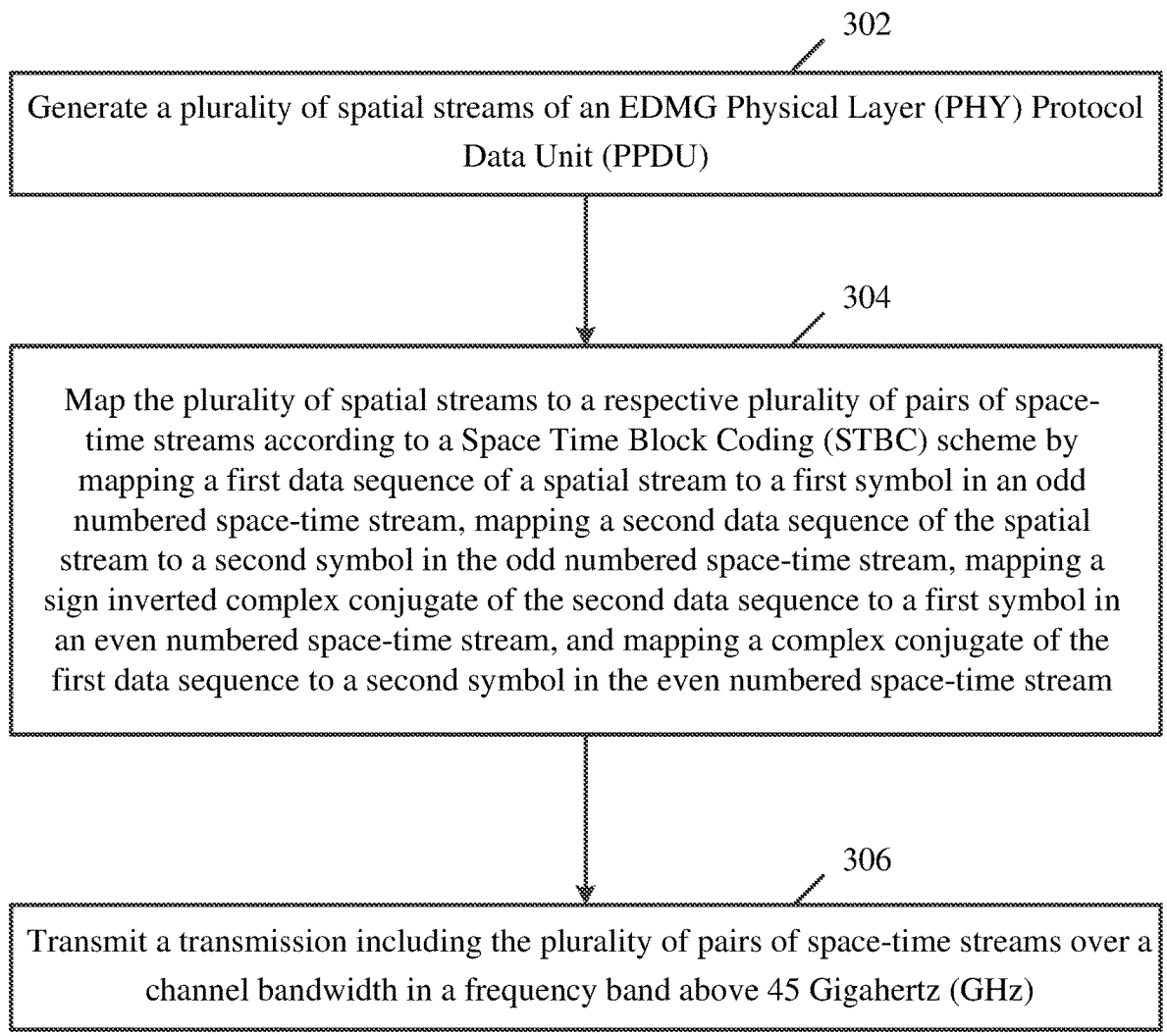
FIG. 3 is a schematic flow-chart illustration of a method of communicating a PPDU, in accordance with some demonstrative embodiments.

Reference is made to FIG. 3, which schematically illustrates a method of communicating a PPDU, in accordance with some demonstrative embodiments. For example, one or more of the operations of the method of FIG. 3 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a mapper, e.g., mapper 129 (FIG. 1), a pilot generator, e.g., pilot generator 127 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 302, the method may include generating a plurality of spatial streams of an EDMG PPDU. For example, controller 124 (FIG. 1) may be configured to cause, trigger, and/or control the wireless station implemented by device 102 (FIG. 1) to generate the plurality of spatial streams of the EDMG PPDU, e.g., as described above.

As indicated at block 304, the method may include mapping the plurality of spatial streams to a respective plurality of pairs of space-time streams according to an STBC scheme, for example, by mapping a first data sequence of a spatial stream to a first symbol in an odd numbered space-time stream, mapping a second data sequence of the spatial stream to a second symbol in the odd numbered space-time stream, mapping a sign inverted complex conjugate of the second data sequence to a first symbol in an even numbered space-time stream, and mapping a complex conjugate of the first data sequence to a second symbol in the even numbered space-time stream. For example, mapper 129 (FIG. 1) may be configured to cause, trigger, and/or control the wireless station implemented by device 102 (FIG. 1) to map the plurality of spatial streams to the respective plurality of pairs of space-time streams according to the STBC scheme, e.g., as described above.

As indicated at block 306, the method may include transmitting a transmission including the plurality of pairs of space-time streams over a channel bandwidth in a frequency band above 45 GHz. For example, controller 124 (FIG. 1) may be configured to cause, trigger, and/or control the wireless station implemented by device 102 (FIG. 1) to transmit the transmission including the plurality of pairs of space-time streams over the channel bandwidth in the frequency band above 45 GHz, e.g., as described above.

Figure 4:
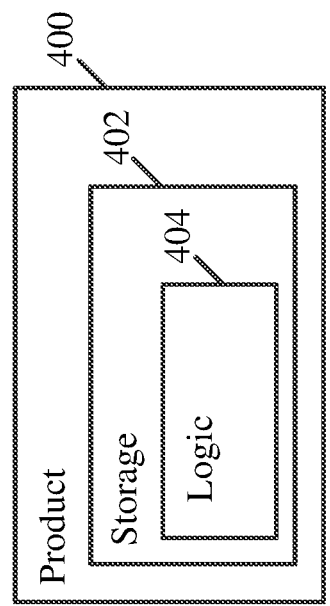
FIG. 4 is a schematic illustration of a product of manufacture, in accordance with some demonstrative embodiments.

Reference is made to FIG. 4, which schematically illustrates a product of manufacture 400, in accordance with some demonstrative embodiments. Product 400 may include one or more tangible computer-readable ("machine-readable") non-transitory storage media 402, which may include computer-executable instructions, e.g., implemented by logic 404, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), mapper 129 (FIG. 1), pilot generator 127 (FIG. 1), controller 124 (FIG. 1), and/or controller 154 (FIG. 1), to cause device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), mapper 129 (FIG. 1), pilot generator 127 (FIG. 1), controller 124 (FIG. 1), and/or controller 154 (FIG. 1) to perform, trigger and/or implement one or more operations and/or functionalities, and/or to perform, trigger and/or implement one or more operations and/or functionalities described with reference to the FIGS. 1, 2, and/or 3, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative embodiments, product 400 and/or storage media 402 may include one or more types of computer-readable storage media capable of storing data, including volatile memory, non-volatile memory, removable or non-removable memory, erasable or non-erasable memory, writeable or re-writeable memory, and the like. For example, storage media 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause an Enhanced Directional Multi-Gigabit (DMG) (EDMG) wireless communication station (STA) to generate a plurality of spatial streams of an EDMG Physical Layer (PHY) Protocol Data Unit (PPDU); map the plurality of spatial streams to a respective plurality of pairs of space-time streams according to a Space Time Block Coding (STBC) scheme by mapping a first data sequence of a spatial stream to a first symbol in an odd numbered space-time stream, mapping a second data sequence of the spatial stream to a second symbol in the odd numbered space-time stream, mapping a sign inverted complex conjugate of the second data sequence to a first symbol in an even numbered space-time stream, and mapping a complex conjugate of the first data sequence to a second symbol in the even numbered space-time stream; and transmit a transmission comprising the plurality of pairs of space-time streams over a channel bandwidth in a frequency band above 45 Gigahertz (GHz).

Example 2 includes the subject matter of Example 1, and optionally, wherein the apparatus is configured to cause the EDMG STA to map a first data sequence of a first spatial stream to a first symbol in a first odd numbered space-time stream, to map a second data sequence of the first spatial stream to a second symbol in the first odd numbered space-time stream, to map a sign inverted complex conjugate of the second data sequence of the first spatial stream to a first symbol in a first even numbered space-time stream, to map a complex conjugate of the first data sequence of the first spatial stream to a second symbol in the first even numbered space-time stream, to map a first data sequence of a second spatial stream to a first symbol in a second odd numbered space-time stream, to map a second data sequence of the second spatial stream to a second symbol in the second odd numbered space-time stream, to map a sign inverted complex conjugate of the second data sequence of the second spatial stream to a first symbol in a second even numbered space-time stream, and to map a complex conjugate of the first data sequence of the second spatial stream to a second symbol in the second even numbered space-time stream.

Example 3 includes the subject matter of Example 1 or 2, and optionally, wherein the first data sequence of the spatial stream comprises a first sequence of data constellation points, the second data sequence of the spatial stream comprises a second sequence of data constellation points subsequent to the first sequence of data constellation points, the second symbol in the odd numbered space-time stream is subsequent to the first symbol in the odd numbered space-time stream, and the second symbol in the even numbered space-time stream is subsequent to the first symbol in the even numbered space-time stream.

Example 4 includes the subject matter of any one of Examples 1-3, and optionally, wherein the transmission comprises a Single Carrier (SC) transmission, the first data sequence comprises a first data symbol block comprising a first sequence of data constellation points, the second data sequence comprises a second data symbol block comprising a second sequence of data constellation points.

Example 5 includes the subject matter of Example 4, and optionally, wherein the apparatus is configured to cause the EDMG STA to map a complex conjugate of a first inverted data symbol block to the second symbol in the even numbered space-time stream, and to map a sign inverted complex conjugate of a second inverted data symbol block to the first symbol in the even numbered space-time stream, the first inverted data symbol block comprising the first data symbol block with inverted symbol order, the second inverted data symbol block comprising the second data symbol block with inverted symbol order.

Example 6 includes the subject matter of Example 4 or 5, and optionally, wherein the apparatus is configured to cause the EDMG STA to map first and second spatial streams to first and second pairs of space-time streams as follows:

$$s^{i_{STS}=1} = (d^{(i_{ss}=1,0)}, d^{(i_{ss}=1,1)}, d^{(i_{ss}=1,2)},$$
$$d^{(i_{ss}=1,3)}, \ldots, d^{(i_{ss}=1,N_{BLKS}-2)}, d^{(i_{ss}=1,N_{BLKS}-1)})$$

$$s^{i_{STS}=2} = \begin{pmatrix} -conj(d_{inv}^{(i_{ss}=1,1)}), conj(d_{inv}^{(i_{ss}=1,0)}), -conj(d_{inv}^{(i_{ss}=1,3)}), \\ conj(d_{inv}^{(i_{ss}=1,2)}), \ldots, -conj(d_{inv}^{(i_{ss}=1,N_{BLKS}-1)}), conj(d_{inv}^{(i_{ss}=1,N_{BLKS}-2)}) \end{pmatrix}$$

$$s^{i_{STS}=3} = (d^{(i_{ss}=1,0)}, d^{(i_{ss}=1,1)}, d^{(i_{ss}=1,2)}, d^{(i_{ss}=1,3)},$$
$$\ldots, d^{(i_{ss}=1,N_{BLKS}-2)}, d^{(i_{ss}=1,N_{BLKS}-1)})$$

$$s^{i_{STS}=4} = \begin{pmatrix} -conj(d_{inv}^{(i_{ss}=2,1)}), conj(d_{inv}^{(i_{ss}=2,0)}), -conj(d_{inv}^{(i_{ss}=2,3)}), \\ conj(d_{inv}^{(i_{ss}=2,2)}), \ldots, -conj(d_{inv}^{(i_{ss}=2,N_{BLKS}-1)}), conj(d_{inv}^{(i_{ss}=2,N_{BLKS}-2)}) \end{pmatrix}$$

wherein:

$s^{i_{STS}}$ denotes modulated data symbols for a space-time stream with a space-time stream index $i_{sts}$, $i_{SS}$ denotes a spatial stream index;

$d^{(i_{ss},q)}$ denotes a data symbol block with an index q in a spatial stream with the index $i_{SS}$;

$d_{inv}^{(i_{ss},q)}$ denotes the data symbol block $d^{(i_{ss},q)}$ with inverted symbol order; and $N_{BLKS}$ denotes a count of data symbol blocks.

Example 7 includes the subject matter of any one of Examples 1-3, and optionally, wherein the transmission comprises an Orthogonal Frequency Division Multiplexing (OFDM) transmission, the first data sequence comprises a first sequence of data constellation points, the second data sequence comprises a second sequence of data constellation points.

Example 8 includes the subject matter of Example 7, and optionally, wherein the apparatus is configured to cause the EDMG STA to map the first sequence of data constellation points to a plurality of data subcarriers of a first OFDM symbol in the odd numbered space-time stream, to map the second sequence of data constellation points to a plurality of data subcarriers of a second OFDM symbol in the odd numbered space-time stream, to map a sign inverted complex conjugate of the second sequence of data constellation points to the plurality of subcarriers of the first OFDM symbol in the even numbered space-time stream, and to map a complex conjugate of the first sequence of data constellation points to the plurality of subcarriers of the second OFDM symbol in the even numbered space-time stream.

Example 9 includes the subject matter of Example 7 or 8, and optionally, wherein the apparatus is configured to cause the EDMG STA to map first and second spatial streams to first and second pairs of space-time streams as follows:

$$D(i_{STS}=1,2n,M_d(k))=d(i_{SS}=1,2n,k)$$

$$D(i_{STS}=1,2n+1,M_d(k))=d(i_{SS}=1,2n+1,k)$$

$$D(i_{STS}=2,2n,M_d(k))=-conj(d(i_{SS}=1,2n+1,k))$$

$$D(i_{STS}=2,2n+1,M_d(k))=conj(d(i_{SS}=1,2n,k))$$

$$D(i_{STS}=3,2n,M_d(k))=d(i_{SS}=2,2n,k)$$

$$D(i_{STS}=3,2n+1,M_d(k))=d(i_{SS}=2,2n+1,k)$$

$$D(i_{STS}=4,2n,M_d(k))=-conj(d(i_{SS}=2,2n+1,k))$$

$$D(i_{STS}=4,2n+1,M_d(k))=conj(d(i_{SS}=2,2n,k))$$

wherein:

$i_{SS}$ denotes a spatial stream index;

n=0, 1, . . . , $N_{SYM}/2-1$, $N_{SYM}$ denotes a number of symbols;

k=0, 1, . . . , $N_{SD}-1$, $N_{SD}$ denotes a number of data subcarriers;

$d(i_{SS},q,k)$ denotes a data constellation point for a q-th symbol and a k-th data tone for the spatial stream index $i_{ss}$; and $D(i_{STS},q,M_d(k))$ denotes an element in a modulated data sequence for a space-time stream index $i_{sts}$ corresponding to the q-th symbol and a k-th modulated data tone Md(k).

Example 10 includes the subject matter of any one of Examples 7-9, and optionally, wherein the apparatus is configured to cause the EDMG STA to map a plurality of pilot sequences to the plurality of pairs of space-time streams by mapping a first pilot sequence to a plurality of pilot subcarriers of the first OFDM symbol in the odd numbered space-time stream, mapping a second pilot sequence to a plurality of pilot subcarriers of the second OFDM symbol in the odd numbered space-time stream, mapping a sign inversion of the second pilot sequence to the plurality of pilot subcarriers of the first OFDM symbol in the even numbered space-time stream, and mapping the first pilot sequence to the plurality of pilot subcarriers of the second OFDM symbol in the even numbered space-time stream.

Example 11 includes the subject matter of Example 10, and optionally, wherein the apparatus is configured to cause the EDMG STA to map the first and second pilot sequences to first and second pairs of space-time streams as follows:

$$P(i_{STS}=1,2n,M_p(k))=P_{N_{SP}}(i_{STS}=1,k)\cdot(2p(2n)-1)$$

$$P(i_{STS}=1,2n+1,M_p(k))=P_{N_{SP}}(i_{STS}=2,k)\cdot(2p(2n+1)-1)$$

$$P(i_{STS}=2,2n,M_p(k))=-P_{N_{SP}}(i_{STS}=2,k)\cdot(2p(2n)-1)$$

$$P(i_{STS}=2,2n+1,M_p(k))=P_{N_{SP}}(i_{STS}=1,k)\cdot(2p(2n+1)-1)$$

$$P(i_{STS}=3,2n,M_p(k))=P_{N_{SP}}(i_{STS}=1,k)\cdot(2p(2n)-1)$$

$$P(i_{STS}=3,2n+1,M_p(k))=P_{N_{SP}}(i_{STS}=2,k)\cdot(2p(2n+1)-1)$$

$$P(i_{STS}=4,2n,M_p(k))=-P_{N_{SP}}(i_{STS}=2,k)\cdot(2p(2n)-1)$$

$$P(i_{STS}=4,2n+1,M_p(k))=P_{N_{SP}}(i_{STS}=1,k)\cdot(2p(2n+1)-1)$$

wherein:

$i_{SS}$ denotes a spatial stream index;

n=0, 1, . . . , $N_{SYM}/2-1$, $N_{SYM}$ denotes a number of symbols;

k=0, 1, . . . , $N_{SP}-1$, $N_{SP}$ denotes a number of pilot subcarriers;

$P_{NSP}(i_{STS},k)$ denotes a pilot sequence for a space-time stream index $i_{sts}$;

p(n) denotes an n-th scrambler bit; and $P(i_{STS},q,M_p(k))$ denotes an element in a modulated pilot sequence for the space-time stream index $i_{sts}$ corresponding to the q-th symbol and a k-th modulated pilot tone Mp(k).

Example 12 includes the subject matter of any one of Examples 1-11, and optionally, wherein the channel bandwidth comprises an aggregated channel bandwidth.

Example 13 includes the subject matter of Example 12, and optionally, wherein the apparatus is configured to cause the EDMG STA to transmit a first pair of space-time streams over a first channel in the aggregated channel bandwidth, and to transmit a second pair of space-time streams over a second channel in the aggregated channel bandwidth.

Example 14 includes the subject matter of Example 13, and optionally, wherein the first channel comprises a 2.16 GHz primary channel, and the second channel comprises at least one 2.16 GHz secondary channel.

Example 15 includes the subject matter of any one of Examples 1-14, and optionally, wherein the channel bandwidth comprises a 2.16+2.16 GHz aggregated channel bandwidth, or a 4.32+4.32 GHz aggregated channel bandwidth.

Example 16 includes the subject matter of any one of Examples 1-15, and optionally, wherein the EDMG PPDU comprises an EDMG Single User (SU) PPDU.

Example 17 includes the subject matter of any one of Examples 1-15, and optionally, wherein the EDMG PPDU comprises an EDMG Multi User (MU) PPDU.

Example 18 includes the subject matter of any one of Examples 1-17, and optionally, comprising a radio.

Example 19 includes the subject matter of any one of Examples 1-18, and optionally, comprising one or more antennas, a memory, and a processor.

Example 20 includes a system of wireless communication comprising an Enhanced Directional Multi-Gigabit (DMG) (EDMG) wireless communication station (STA), the EDMG STA comprising a radio; a memory; a processor; one or more antennas; and a controller configured to cause the EDMG STA to generate a plurality of spatial streams of an EDMG Physical Layer (PHY) Protocol Data Unit (PPDU); map the plurality of spatial streams to a respective plurality of pairs of space-time streams according to a Space Time Block Coding (STBC) scheme by mapping a first data sequence of a spatial stream to a first symbol in an odd numbered space-time stream, mapping a second data sequence of the spatial stream to a second symbol in the odd numbered space-time stream, mapping a sign inverted complex conjugate of the second data sequence to a first symbol in an even numbered space-time stream, and mapping a complex conjugate of the first data sequence to a second symbol in the even numbered space-time stream; and transmit a transmission comprising the plurality of pairs of space-time streams over a channel bandwidth in a frequency band above 45 Gigahertz (GHz).

Example 21 includes the subject matter of Example 20, and optionally, wherein the controller is configured to cause the EDMG STA to map a first data sequence of a first spatial stream to a first symbol in a first odd numbered space-time stream, to map a second data sequence of the first spatial stream to a second symbol in the first odd numbered space-time stream, to map a sign inverted complex conjugate of the second data sequence of the first spatial stream to a first symbol in a first even numbered space-time stream, to map a complex conjugate of the first data sequence of the first spatial stream to a second symbol in the first even numbered space-time stream, to map a first data sequence of a second spatial stream to a first symbol in a second odd numbered space-time stream, to map a second data sequence of the second spatial stream to a second symbol in the second odd numbered space-time stream, to map a sign inverted complex conjugate of the second data sequence of the second spatial stream to a first symbol in a second even numbered space-time stream, and to map a complex conjugate of the first data sequence of the second spatial stream to a second symbol in the second even numbered space-time stream.

Example 22 includes the subject matter of Example 20 or 21, and optionally, wherein the first data sequence of the spatial stream comprises a first sequence of data constellation points, the second data sequence of the spatial stream comprises a second sequence of data constellation points subsequent to the first sequence of data constellation points, the second symbol in the odd numbered space-time stream is subsequent to the first symbol in the odd numbered space-time stream, and the second symbol in the even numbered space-time stream is subsequent to the first symbol in the even numbered space-time stream.

Example 23 includes the subject matter of any one of Examples 20-22, and optionally, wherein the transmission comprises a Single Carrier (SC) transmission, the first data sequence comprises a first data symbol block comprising a first sequence of data constellation points, the second data sequence comprises a second data symbol block comprising a second sequence of data constellation points.

Example 24 includes the subject matter of Example 23, and optionally, wherein the controller is configured to cause the EDMG STA to map a complex conjugate of a first inverted data symbol block to the second symbol in the even numbered space-time stream, and to map a sign inverted complex conjugate of a second inverted data symbol block to the first symbol in the even numbered space-time stream, the first inverted data symbol block comprising the first data symbol block with inverted symbol order, the second inverted data symbol block comprising the second data symbol block with inverted symbol order.

Example 25 includes the subject matter of Example 23 or 24, and optionally, wherein the controller is configured to cause the EDMG STA to map first and second spatial streams to first and second pairs of space-time streams as follows:

$$s^{i_{STS}=1} = (d^{(i_{ss}=1,0)}, d^{(i_{ss}=1,1)}, d^{(i_{ss}=1,2)},$$
$$d^{(i_{ss}=1,3)}, \ldots, d^{(i_{ss}=1,N_{BLKS}-2)}, d^{(i_{ss}=1,N_{BLKS}-1)})$$

$$s^{i_{STS}=2} = \begin{pmatrix} -conj(d_{inv}^{(i_{ss}=1,1)}), conj(d_{inv}^{(i_{ss}=1,0)}), -conj(d_{inv}^{(i_{ss}=1,3)}), \\ conj(d_{inv}^{(i_{ss}=1,2)}), \ldots, -conj(d_{inv}^{(i_{ss}=1,N_{BLKS}-1)}), conj(d_{inv}^{(i_{ss}=1,N_{BLKS}-2)}) \end{pmatrix}$$

$$s^{i_{STS}=3} = (d^{(i_{ss}=1,0)}, d^{(i_{ss}=1,1)}, d^{(i_{ss}=1,2)}, d^{(i_{ss}=1,3)},$$
$$\ldots, d^{(i_{ss}=1,N_{BLKS}-2)}, d^{(i_{ss}=1,N_{BLKS}-1)})$$

$$s^{i_{STS}=4} = \begin{pmatrix} -conj(d_{inv}^{(i_{ss}=2,1)}), conj(d_{inv}^{(i_{ss}=2,0)}), -conj(d_{inv}^{(i_{ss}=2,3)}), \\ conj(d_{inv}^{(i_{ss}=2,2)}), \ldots, -conj(d_{inv}^{(i_{ss}=2,N_{BLKS}-1)}), conj(d_{inv}^{(i_{ss}=2,N_{BLKS}-2)}) \end{pmatrix}$$

wherein:

$s^{i_{STS}}$ denotes modulated data symbols for a space-time stream with a space-time stream index $i_{sts}$, $i_{SS}$ denotes a spatial stream index;

$d^{(i_{ss},q)}$ denotes a data symbol block with an index q in a spatial stream with the index $i_{SS}$;

$d_{inv}^{(i_{ss},q)}$ denotes the data symbol block $d^{(i_{ss},q)}$ with inverted symbol order; and $N_{BLKS}$ denotes a count of data symbol blocks.

Example 26 includes the subject matter of any one of Examples 20-22, and optionally, wherein the transmission comprises an Orthogonal Frequency Division Multiplexing (OFDM) transmission, the first data sequence comprises a first sequence of data constellation points, the second data sequence comprises a second sequence of data constellation points.

Example 27 includes the subject matter of Example 26, and optionally, wherein the controller is configured to cause the EDMG STA to map the first sequence of data constellation points to a plurality of data subcarriers of a first OFDM symbol in the odd numbered space-time stream, to map the second sequence of data constellation points to a plurality of data subcarriers of a second OFDM symbol in the odd numbered space-time stream, to map a sign inverted complex conjugate of the second sequence of data constellation points to the plurality of subcarriers of the first OFDM symbol in the even numbered space-time stream, and to map a complex conjugate of the first sequence of data constellation points to the plurality of subcarriers of the second OFDM symbol in the even numbered space-time stream.

Example 28 includes the subject matter of Example 26 or 27, and optionally, wherein the controller is configured to cause the EDMG STA to map first and second spatial streams to first and second pairs of space-time streams as follows:

$$D(i_{STS}=1,2n,M_d(k))=d(i_{SS}=1,2n,k)$$

$$D(i_{STS}=1,2n+1,M_d(k))=d(i_{SS}=1,2n+1,k)$$

$$D(i_{STS}=2,2n,M_d(k))=-\text{conj}(d(i_{SS}=1,2n+1,k))$$

$$D(i_{STS}=2,2n+1,M_d(k))=\text{conj}(d(i_{SS}=1,2n,k))$$

$$D(i_{STS}=3,2n,M_d(k))=d(i_{SS}=2,2n,k)$$

$$D(i_{STS}=3,2n+1,M_d(k))=d(i_{SS}=2,2n+1,k)$$

$$D(i_{STS}=4,2n,M_d(k))=-\text{conj}(d(i_{SS}=2,2n+1,k))$$

$$D(i_{STS}=4,2n+1,M_d(k))=\text{conj}(d(i_{SS}=2,2n,k))$$

wherein:
$i_{SS}$ denotes a spatial stream index;
n=0, 1, . . . , $N_{SYM}/2-1$, $N_{SYM}$ denotes a number of symbols;
k=0, 1, $N_{SD}-1$, $N_{SD}$ denotes a number of data subcarriers;
$d(i_{SS},q,k)$ denotes a data constellation point for a q-th symbol and a k-th data tone for the spatial stream index $i_{ss}$; and
$D(i_{STS},q,M_d(k))$ denotes an element in a modulated data sequence for a space-time stream index $i_{sts}$ corresponding to the q-th symbol and a k-th modulated data tone Md(k).

Example 29 includes the subject matter of any one of Examples 26-28, and optionally, wherein the controller is configured to cause the EDMG STA to map a plurality of pilot sequences to the plurality of pairs of space-time streams by mapping a first pilot sequence to a plurality of pilot subcarriers of the first OFDM symbol in the odd numbered space-time stream, mapping a second pilot sequence to a plurality of pilot subcarriers of the second OFDM symbol in the odd numbered space-time stream, mapping a sign inversion of the second pilot sequence to the plurality of pilot subcarriers of the first OFDM symbol in the even numbered space-time stream, and mapping the first pilot sequence to the plurality of pilot subcarriers of the second OFDM symbol in the even numbered space-time stream.

Example 30 includes the subject matter of Example 29, and optionally, wherein the controller is configured to cause the EDMG STA to map the first and second pilot sequences to first and second pairs of space-time streams as follows:

$$P(i_{STS}=1,2n,M_p(k))=P_{NSP}(i_{STS}=1,k)\cdot(2p(2n)-1)$$

$$P(i_{STS}=1,2n+1,M_p(k))=P_{NSP}(i_{STS}=2,k)\cdot(2p(2n+1)-1)$$

$$P(i_{STS}=2,2n,M_p(k))=-P_{NSP}(i_{STS}=2,k)\cdot(2p(2n)-1)$$

$$P(i_{STS}=2,2n+1,M_p(k))=P_{NSP}(i_{STS}=1,k)\cdot(2p(2n+1)-1)$$

$$P(i_{STS}=3,2n,M_p(k))=P_{NSP}(i_{STS}=1,k)\cdot(2p(2n)-1)$$

$$P(i_{STS}=3,2n+1,M_p(k))=P_{NSP}(i_{STS}=2,k)\cdot(2p(2n+1)-1)$$

$$P(i_{STS}=4,2n,M_p(k))=-P_{NSP}(i_{STS}=2,k)\cdot(2p(2n)-1)$$

$$P(i_{STS}=4,2n+1,M_p(k))=P_{NSP}(i_{STS}=1,k)\cdot(2p(2n+1)-1)$$

wherein:
$i_{SS}$ denotes a spatial stream index;
n=0, 1, . . . , $N_{SYM}/2-1$, $N_{SYM}$ denotes a number of symbols;
k=0, 1, . . . , $N_{SP}-1$, $N_{SP}$ denotes a number of pilot subcarriers;
$P_{NSP}(i_{STS},k)$ denotes a pilot sequence for a space-time stream index $i_{sts}$;
p(n) denotes an n-th scrambler bit; and
$P(i_{STS},q,M_p(k))$ denotes an element in a modulated pilot sequence for the space-time stream index $i_{sts}$ corresponding to the q-th symbol and a k-th modulated pilot tone Mp(k).

Example 31 includes the subject matter of any one of Examples 20-30, and optionally, wherein the channel bandwidth comprises an aggregated channel bandwidth.

Example 32 includes the subject matter of Example 31, and optionally, wherein the controller is configured to cause the EDMG STA to transmit a first pair of space-time streams over a first channel in the aggregated channel bandwidth, and to transmit a second pair of space-time streams over a second channel in the aggregated channel bandwidth.

Example 33 includes the subject matter of Example 32, and optionally, wherein the first channel comprises a 2.16 GHz primary channel, and the second channel comprises at least one 2.16 GHz secondary channel.

Example 34 includes the subject matter of any one of Examples 20-33, and optionally, wherein the channel bandwidth comprises a 2.16+2.16 GHz aggregated channel bandwidth, or a 4.32+4.32 GHz aggregated channel bandwidth.

Example 35 includes the subject matter of any one of Examples 20-34, and optionally, wherein the EDMG PPDU comprises an EDMG Single User (SU) PPDU.

Example 36 includes the subject matter of any one of Examples 20-34, and optionally, wherein the EDMG PPDU comprises an EDMG Multi User (MU) PPDU.

Example 37 includes a method to be performed at an Enhanced Directional Multi-Gigabit (DMG) (EDMG) wireless communication station (STA), the method comprising generating a plurality of spatial streams of an EDMG Physical Layer (PHY) Protocol Data Unit (PPDU); mapping the plurality of spatial streams to a respective plurality of pairs of space-time streams according to a Space Time Block Coding (STBC) scheme by mapping a first data sequence of a spatial stream to a first symbol in an odd numbered space-time stream, mapping a second data sequence of the spatial stream to a second symbol in the odd numbered space-time stream, mapping a sign inverted complex conjugate of the second data sequence to a first symbol in an even numbered space-time stream, and mapping a complex conjugate of the first data sequence to a second symbol in the even numbered space-time stream; and transmitting a transmission comprising the plurality of pairs of space-time streams over a channel bandwidth in a frequency band above 45 Gigahertz (GHz).

Example 38 includes the subject matter of Example 37, and optionally, comprising mapping a first data sequence of a first spatial stream to a first symbol in a first odd numbered space-time stream, mapping a second data sequence of the first spatial stream to a second symbol in the first odd numbered space-time stream, mapping a sign inverted complex conjugate of the second data sequence of the first spatial stream to a first symbol in a first even numbered space-time stream, mapping a complex conjugate of the first data sequence of the first spatial stream to a second symbol in the first even numbered space-time stream, mapping a first data sequence of a second spatial stream to a first symbol in a second odd numbered space-time stream, mapping a second data sequence of the second spatial stream to a second symbol in the second odd numbered space-time stream, mapping a sign inverted complex conjugate of the second data sequence of the second spatial stream to a first symbol in a second even numbered space-time stream, and mapping a complex conjugate of the first data sequence of the second spatial stream to a second symbol in the second even numbered space-time stream.

Example 39 includes the subject matter of Example 37 or 38, and optionally, wherein the first data sequence of the spatial stream comprises a first sequence of data constellation points, the second data sequence of the spatial stream comprises a second sequence of data constellation points subsequent to the first sequence of data constellation points, the second symbol in the odd numbered space-time stream is subsequent to the first symbol in the odd numbered space-time stream, and the second symbol in the even numbered space-time stream is subsequent to the first symbol in the even numbered space-time stream.

Example 40 includes the subject matter of any one of Examples 37-39, and optionally, wherein the transmission comprises a Single Carrier (SC) transmission, the first data sequence comprises a first data symbol block comprising a first sequence of data constellation points, the second data sequence comprises a second data symbol block comprising a second sequence of data constellation points.

Example 41 includes the subject matter of Example 40, and optionally, comprising mapping a complex conjugate of a first inverted data symbol block to the second symbol in the even numbered space-time stream, and mapping a sign inverted complex conjugate of a second inverted data symbol block to the first symbol in the even space-time stream, the first inverted data symbol block comprising the first data symbol block with inverted symbol order, the second inverted data symbol block comprising the second data symbol block with inverted symbol order.

Example 42 includes the subject matter of Example 40 or 41, and optionally, comprising mapping first and second spatial streams to first and second pairs of space-time streams as follows:

$$s^{i_{STS}=1} = (d^{(i_{ss}=1,0)}, d^{(i_{ss}=1,1)}, d^{(i_{ss}=1,2)},$$
$$d^{(i_{ss}=1,3)}, \ldots, d^{(i_{ss}=1,N_{BLKS}-2)}, d^{(i_{ss}=1,N_{BLKS}-1)})$$

$$s^{i_{STS}=2} = \begin{pmatrix} -conj(d_{inv}^{(i_{ss}=1,1)}), conj(d_{inv}^{(i_{ss}=1,0)}), -conj(d_{inv}^{(i_{ss}=1,3)}), \\ conj(d_{inv}^{(i_{ss}=1,2)}), \ldots, -conj(d_{inv}^{(i_{ss}=1,N_{BLKS}-1)}), conj(d_{inv}^{(i_{ss}=1,N_{BLKS}-2)}) \end{pmatrix}$$

$$s^{i_{STS}=3} = (d^{(i_{ss}=1,0)}, d^{(i_{ss}=1,1)}, d^{(i_{ss}=1,2)}, d^{(i_{ss}=1,3)},$$
$$\ldots, d^{(i_{ss}=1,N_{BLKS}-2)}, d^{(i_{ss}=1,N_{BLKS}-1)})$$

$$s^{i_{STS}=4} = \begin{pmatrix} -conj(d_{inv}^{(i_{ss}=2,1)}), conj(d_{inv}^{(i_{ss}=2,0)}), -conj(d_{inv}^{(i_{ss}=2,3)}), \\ conj(d_{inv}^{(i_{ss}=2,2)}), \ldots, -conj(d_{inv}^{(i_{ss}=2,N_{BLKS}-1)}), conj(d_{inv}^{(i_{ss}=2,N_{BLKS}-2)}) \end{pmatrix}$$

wherein:

$s^{i_{STS}}$ denotes modulated data symbols for a space-time stream with a space-time stream index $i_{sts}$;

$i_{SS}$ denotes a spatial stream index;

$d^{(i_{ss},q)}$ denotes a data symbol block with an index q in a spatial stream with the index $i_{SS}$;

$d_{inv}^{(i_{ss},q)}$ denotes the data symbol block $d^{(i_{ss},q)}$ with inverted symbol order; and $N_{BLKS}$ denotes a count of data symbol blocks.

Example 43 includes the subject matter of any one of Examples 37-39, and optionally, wherein the transmission comprises an Orthogonal Frequency Division Multiplexing (OFDM) transmission, the first data sequence comprises a first sequence of data constellation points, the second data sequence comprises a second sequence of data constellation points.

Example 44 includes the subject matter of Example 43, and optionally, comprising mapping the first sequence of data constellation points to a plurality of data subcarriers of a first OFDM symbol in the odd numbered space-time stream, mapping the second sequence of data constellation points to a plurality of data subcarriers of a second OFDM symbol in the odd numbered space-time stream, mapping a sign inverted complex conjugate of the second sequence of data constellation points to the plurality of subcarriers of the first OFDM symbol in the even numbered space-time stream, and mapping a complex conjugate of the first sequence of data constellation points to the plurality of subcarriers of the second OFDM symbol in the even numbered space-time stream.

Example 45 includes the subject matter of Example 43 or 44, and optionally, comprising mapping first and second spatial streams to first and second pairs of space-time streams as follows:

$$D(i_{STS}=1,2n,M_d(k))=d(i_{SS}=1,2n,k)$$

$$D(i_{STS}=1,2n+1,M_d(k))=d(i_{SS}=1,2n+1,k)$$

$$D(i_{STS}=2,2n,M_d(k))=-conj(d(i_{SS}=1,2n+1,k))$$

$$D(i_{STS}=2,2n+1,M_d(k))=conj(d(i_{SS}=1,2n,k))$$

$$D(i_{STS}=3,2n,M_d(k))=d(i_{SS}=2,2n,k)$$

$$D(i_{STS}=3,2n+1,M_d(k))=d(i_{SS}=2,2n+1,k)$$

$$D(i_{STS}=4,2n,M_d(k))=-conj(d(i_{SS}=2,2n+1,k))$$

$$D(i_{STS}=4,2n+1,M_d(k))=conj(d(i_{SS}=2,2n,k))$$

wherein:

$i_{SS}$ denotes a spatial stream index;

n=0, 1, . . . , $N_{SYM}/2-1$, $N_{SYM}$ denotes a number of symbols;

k=0, 1, $N_{SD}-1$, $N_{SD}$ denotes a number of data subcarriers;

$d(i_{SS},q,k)$ denotes a data constellation point for a q-th symbol and a k-th data tone for the spatial stream index $i_{ss}$; and $D(i_{STS},q,M_d(k))$ denotes an element in a modulated data sequence for a space-time stream index $i_{sts}$ corresponding to the q-th symbol and a k-th modulated data tone $M_d(k)$.

Example 46 includes the subject matter of any one of Examples 43-45, and optionally, comprising mapping a plurality of pilot sequences to the plurality of pairs of space-time streams by mapping a first pilot sequence to a plurality of pilot subcarriers of the first OFDM symbol in the odd numbered space-time stream, mapping a second pilot sequence to a plurality of pilot subcarriers of the second OFDM symbol in the odd numbered space-time stream, mapping a sign inversion of the second pilot sequence to the plurality of pilot subcarriers of the first OFDM symbol in the even numbered space-time stream, and mapping the first pilot sequence to the plurality of pilot subcarriers of the second OFDM symbol in the even numbered space-time stream.

Example 47 includes the subject matter of Example 46, and optionally, comprising mapping the first and second pilot sequences to first and second pairs of space-time streams as follows:

$$P(i_{STS}=1,2n,M_p(k))=P_{N_{SP}}(i_{STS}=1,k)\cdot(2p(2n)-1)$$

$$P(i_{STS}=1,2n+1,M_p(k))=P_{N_{SP}}(i_{STS}=2,k)\cdot(2p(2n+1)-1)$$

$$P(i_{STS}=2,2n,M_p(k))=-P_{N_{SP}}(i_{STS}=2,k)\cdot(2p(2n)-1)$$

$$P(i_{STS}=2,2n+1,M_p(k))=P_{N_{SP}}(i_{STS}=1,k)\cdot(2p(2n+1)-1)$$

$$P(i_{STS}=3,2n,M_p(k))=P_{N_{SP}}(i_{STS}=1,k)\cdot(2p(2n)-1)$$

$$P(i_{STS}=3,2n+1,M_p(k))=P_{N_{SP}}(i_{STS}=2,k)\cdot(2p(2n+1)-1)$$

$$P(i_{STS}=4,2n,M_p(k))=P_{N_{SP}}(i_{STS}=2,k)\cdot(2p(2n)-1)$$

$$P(i_{STS}=4,2n+1,M_p(k))=P_{N_{SP}}(i_{STS}=1,k)\cdot(2p(2n+1)-1)$$

wherein:

$i_{SS}$ denotes a spatial stream index;

n=0, 1, . . . , $N_{SYM}/2-1$, $N_{SYM}$ denotes a number of symbols;

k=0, 1, . . . , $N_{SP}-1$, $N_{SP}$ denotes a number of pilot subcarriers;

$P_{NSP}(i_{STS},k)$ denotes a pilot sequence for a space-time stream index $i_{sts}$;

p(n) denotes an n-th scrambler bit; and $P(i_{STS},q,M_p(k))$ denotes an element in a modulated pilot sequence for the space-time stream index $i_{sts}$ corresponding to the q-th symbol and a k-th modulated pilot tone Mp(k).

Example 48 includes the subject matter of any one of Examples 37-47, and optionally, wherein the channel bandwidth comprises an aggregated channel bandwidth.

Example 49 includes the subject matter of Example 48, and optionally, comprising transmitting a first pair of space-time streams over a first channel in the aggregated channel bandwidth, and transmitting a second pair of space-time streams over a second channel in the aggregated channel bandwidth.

Example 50 includes the subject matter of Example 49, and optionally, wherein the first channel comprises a 2.16 GHz primary channel, and the second channel comprises at least one 2.16 GHz secondary channel.

Example 51 includes the subject matter of any one of Examples 37-50, and optionally, wherein the channel bandwidth comprises a 2.16+2.16 GHz aggregated channel bandwidth, or a 4.32+4.32 GHz aggregated channel bandwidth.

Example 52 includes the subject matter of any one of Examples 37-51, and optionally, wherein the EDMG PPDU comprises an EDMG Single User (SU) PPDU.

Example 53 includes the subject matter of any one of Examples 37-51, and optionally, wherein the EDMG PPDU comprises an EDMG Multi User (MU) PPDU.

Example 54 includes a product comprising one or more tangible computer-readable non-transitory storage media comprising computer-executable instructions operable to, when executed by at least one processor, enable the at least one processor to cause an Enhanced Directional Multi-Gigabit (DMG) (EDMG) wireless communication station (STA) to generate a plurality of spatial streams of an EDMG Physical Layer (PHY) Protocol Data Unit (PPDU); map the plurality of spatial streams to a respective plurality of pairs of space-time streams according to a Space Time Block Coding (STBC) scheme by mapping a first data sequence of a spatial stream to a first symbol in an odd numbered space-time stream, mapping a second data sequence of the spatial stream to a second symbol in the odd numbered space-time stream, mapping a sign inverted complex conjugate of the second data sequence to a first symbol in an even numbered space-time stream, and mapping a complex conjugate of the first data sequence to a second symbol in the even numbered space-time stream; and transmit a transmission comprising the plurality of pairs of space-time streams over a channel bandwidth in a frequency band above 45 Gigahertz (GHz).

Example 55 includes the subject matter of Example 54, and optionally, wherein the instructions, when executed, cause the EDMG STA to map a first data sequence of a first spatial stream to a first symbol in a first odd numbered space-time stream, to map a second data sequence of the first spatial stream to a second symbol in the first odd numbered space-time stream, to map a sign inverted complex conjugate of the second data sequence of the first spatial stream to a first symbol in a first even numbered space-time stream, to map a complex conjugate of the first data sequence of the first spatial stream to a second symbol in the first even numbered space-time stream, to map a first data sequence of a second spatial stream to a first symbol in a second odd numbered space-time stream, to map a second data sequence of the second spatial stream to a second symbol in the second odd numbered space-time stream, to map a sign inverted complex conjugate of the second data sequence of the second spatial stream to a first symbol in a second even numbered space-time stream, and to map a complex conjugate of the first data sequence of the second spatial stream to a second symbol in the second even numbered space-time stream.

Example 56 includes the subject matter of Example 54 or 55, and optionally, wherein the first data sequence of the spatial stream comprises a first sequence of data constellation points, the second data sequence of the spatial stream comprises a second sequence of data constellation points subsequent to the first sequence of data constellation points, the second symbol in the odd numbered space-time stream is subsequent to the first symbol in the odd numbered space-time stream, and the second symbol in the even numbered space-time stream is subsequent to the first symbol in the even numbered space-time stream.

Example 57 includes the subject matter of any one of Examples 54-56, and optionally, wherein the transmission comprises a Single Carrier (SC) transmission, the first data sequence comprises a first data symbol block comprising a first sequence of data constellation points, the second data sequence comprises a second data symbol block comprising a second sequence of data constellation points.

Example 58 includes the subject matter of Example 57, and optionally, wherein the instructions, when executed, cause the EDMG STA to map a complex conjugate of a first inverted data symbol block to the second symbol in the even numbered space-time stream, and to map a sign inverted complex conjugate of a second inverted data symbol block to the first symbol in the even numbered space-time stream, the first inverted data symbol block comprising the first data symbol block with inverted symbol order, the second inverted data symbol block comprising the second data symbol block with inverted symbol order.

Example 59 includes the subject matter of Example 57 or 58, and optionally, wherein the instructions, when executed, cause the EDMG STA to map first and second spatial streams to first and second pairs of space-time streams as follows:

$$s^{i_{STS}=1} = (d^{(i_{ss}=1,0)}, d^{(i_{ss}=1,1)}, d^{(i_{ss}=1,2)},$$
$$d^{(i_{ss}=1,3)}, \ldots, d^{(i_{ss}=1,N_{BLKS}-2)}, d^{(i_{ss}=1,N_{BLKS}-1)})$$

$$s^{i_{STS}=2} = \begin{pmatrix} -conj(d_{inv}^{(i_{ss}=1,1)}), conj(d_{inv}^{(i_{ss}=1,0)}), -conj(d_{inv}^{(i_{ss}=1,3)}), \\ conj(d_{inv}^{(i_{ss}=1,2)}), \ldots, -conj(d_{inv}^{(i_{ss}=1,N_{BLKS}-1)}), conj(d_{inv}^{(i_{ss}=1,N_{BLKS}-2)}) \end{pmatrix}$$

$$s^{i_{STS}=3} = (d^{(i_{ss}=1,0)}, d^{(i_{ss}=1,1)}, d^{(i_{ss}=1,2)}, d^{(i_{ss}=1,3)},$$
$$\ldots, d^{(i_{ss}=1,N_{BLKS}-2)}, d^{(i_{ss}=1,N_{BLKS}-1)})$$

$$s^{i_{STS}=4} = \begin{pmatrix} -conj(d_{inv}^{(i_{ss}=2,1)}), conj(d_{inv}^{(i_{ss}=2,0)}), -conj(d_{inv}^{(i_{ss}=2,3)}), \\ conj(d_{inv}^{(i_{ss}=2,2)}), \ldots, -conj(d_{inv}^{(i_{ss}=2,N_{BLKS}-1)}), conj(d_{inv}^{(i_{ss}=2,N_{BLKS}-2)}) \end{pmatrix}$$

wherein:

$s^{i_{STS}}$ denotes modulated data symbols for a space-time stream with a space-time stream index $i_{sts}$, $i_{SS}$ denotes a spatial stream index;

$d^{(i_{ss},q)}$ denotes a data symbol block with an index q in a spatial stream with the index $i_{SS}$;

$d_{inv}^{(i_{ss},q)}$ denotes the data symbol block $d^{(i_{ss},q)}$ with inverted symbol order; and $N_{BLKS}$ denotes a count of data symbol blocks.

Example 60 includes the subject matter of any one of Examples 54-56, and optionally, wherein the transmission comprises an Orthogonal Frequency Division Multiplexing (OFDM) transmission, the first data sequence comprises a first sequence of data constellation points, the second data sequence comprises a second sequence of data constellation points.

Example 61 includes the subject matter of Example 60, and optionally, wherein the instructions, when executed, cause the EDMG STA to map the first sequence of data constellation points to a plurality of data subcarriers of a first OFDM symbol in the odd numbered space-time stream, to map the second sequence of data constellation points to a plurality of data subcarriers of a second OFDM symbol in the odd numbered space-time stream, to map a sign inverted complex conjugate of the second sequence of data constellation points to the plurality of subcarriers of the first OFDM symbol in the even numbered space-time stream, and to map a complex conjugate of the first sequence of data constellation points to the plurality of subcarriers of the second OFDM symbol in the even numbered space-time stream.

Example 62 includes the subject matter of Example 60 or 61, and optionally, wherein the instructions, when executed, cause the EDMG STA to map first and second spatial streams to first and second pairs of space-time streams as follows:

$$D(i_{STS}=1,2n,M_d(k))=d(i_{SS}=1,2n,k)$$

$$D(i_{STS}=1,2n+1,M_d(k))=d(i_{SS}=1,2n+1,k)$$

$$D(i_{STS}=2,2n,M_d(k))=-conj(d(i_{SS}=1,2n+1,k))$$

$$D(i_{STS}=2,2n+1,M_d(k))=conj(d(i_{SS}=1,2n,k))$$

$$D(i_{STS}=3,2n,M_d(k))=d(i_{SS}=2,2n,k)$$

$$D(i_{STS}=3,2n+1,M_d(k))=d(i_{SS}=2,2n+1,k)$$

$$D(i_{STS}=4,2n,M_d(k))=-conj(d(i_{SS}=2,2n+1,k))$$

$$D(i_{STS}=4,2n+1,M_d(k))=conj(d(i_{SS}=2,2n,k))$$

wherein:

$i_{SS}$ denotes a spatial stream index;

n=0, 1, . . . , $N_{SYM}/2-1$, $N_{SYM}$ denotes a number of symbols;

k=0, 1, $N_{SD}-1$, $N_{SD}$ denotes a number of data subcarriers;

$d(i_{SS},q,k)$ denotes a data constellation point for a q-th symbol and a k-th data tone for the spatial stream index $i_{ss}$; and $D(i_{STS},q,M_d(k))$ denotes an element in a modulated data sequence for a space-time stream index $i_{sts}$ corresponding to the q-th symbol and a k-th modulated data tone $M_d(k)$.

Example 63 includes the subject matter of any one of Examples 60-62, and optionally, wherein the instructions, when executed, cause the EDMG STA to map a plurality of pilot sequences to the plurality of pairs of space-time streams by mapping a first pilot sequence to a plurality of pilot subcarriers of the first OFDM symbol in the odd numbered space-time stream, mapping a second pilot sequence to a plurality of pilot subcarriers of the second OFDM symbol in the odd numbered space-time stream, mapping a sign inversion of the second pilot sequence to the plurality of pilot subcarriers of the first OFDM symbol in the even numbered space-time stream, and mapping the first pilot sequence to the plurality of pilot subcarriers of the second OFDM symbol in the even numbered space-time stream.

Example 64 includes the subject matter of Example 63, and optionally, wherein the instructions, when executed, cause the EDMG STA to map the first and second pilot sequences to first and second pairs of space-time streams as follows:

$$P(i_{STS}=1,2n,M_p(k))=P_{N_{SP}}(i_{STS}=1,k)\cdot(2p(2n)-1)$$

$$P(i_{STS}=1,2n+1,M_p(k))=P_{N_{SP}}(i_{STS}=2,k)\cdot(2p(2n+1)-1)$$

$$P(i_{STS}=2,2n,M_p(k))=-P_{N_{SP}}(i_{STS}=2,k)\cdot(2p(2n)-1)$$

$$P(i_{STS}=2,2n+1,M_p(k))=P_{N_{SP}}(i_{STS}=1,k)\cdot(2p(2n+1)-1)$$

$$P(i_{STS}=3,2n,M_p(k))=P_{N_{SP}}(i_{STS}=1,k)\cdot(2p(2n)-1)$$

$$P(i_{STS}=3,2n+1,M_p(k))=P_{N_{SP}}(i_{STS}=2,k)\cdot(2p(2n+1)-1)$$

$$P(i_{STS}=4,2n,M_p(k))=P_{N_{SP}}(i_{STS}=2,k)\cdot(2p(2n)-1)$$

$$P(i_{STS}=4,2n+1,M_p(k))=P_{N_{SP}}(i_{STS}=1,k)\cdot(2p(2n+1)-1)$$

wherein:

$i_{SS}$ denotes a spatial stream index;

n=0, 1, . . . , $N_{SYM}/2-1$, $N_{SYM}$ denotes a number of symbols;

k=0, 1, . . . , $N_{SP}-1$, $N_{SP}$ denotes a number of pilot subcarriers;

$P_{N_{SP}}(i_{STS},k)$ denotes a pilot sequence for a space-time stream index $i_{sts}$;

p(n) denotes an n-th scrambler bit; and $P(i_{STS},q,M_p(k))$ denotes an element in a modulated pilot sequence for the space-time stream index $i_{sts}$ corresponding to the q-th symbol and a k-th modulated pilot tone Mp(k).

Example 65 includes the subject matter of any one of Examples 54-64, and optionally, wherein the channel bandwidth comprises an aggregated channel bandwidth.

Example 66 includes the subject matter of Example 65, and optionally, wherein the instructions, when executed, cause the EDMG STA to transmit a first pair of space-time streams over a first channel in the aggregated channel bandwidth, and to transmit a second pair of space-time streams over a second channel in the aggregated channel bandwidth.

Example 67 includes the subject matter of Example 66, and optionally, wherein the first channel comprises a 2.16 GHz primary channel, and the second channel comprises at least one 2.16 GHz secondary channel.

Example 68 includes the subject matter of any one of Examples 54-67, and optionally, wherein the channel bandwidth comprises a 2.16+2.16 GHz aggregated channel bandwidth, or a 4.32+4.32 GHz aggregated channel bandwidth.

Example 69 includes the subject matter of any one of Examples 54-68, and optionally, wherein the EDMG PPDU comprises an EDMG Single User (SU) PPDU.

Example 70 includes the subject matter of any one of Examples 54-68, and optionally, wherein the EDMG PPDU comprises an EDMG Multi User (MU) PPDU.

Example 71 includes an apparatus of wireless communication by an Enhanced Directional Multi-Gigabit (DMG) (EDMG) wireless communication station (STA), the apparatus comprising means for generating a plurality of spatial streams of an EDMG Physical Layer (PHY) Protocol Data Unit (PPDU); means for mapping the plurality of spatial streams to a respective plurality of pairs of space-time streams according to a Space Time Block Coding (STBC) scheme by mapping a first data sequence of a spatial stream to a first symbol in an odd numbered space-time stream, mapping a second data sequence of the spatial stream to a second symbol in the odd numbered space-time stream, mapping a sign inverted complex conjugate of the second data sequence to a first symbol in an even numbered space-time stream, and mapping a complex conjugate of the first data sequence to a second symbol in the even numbered space-time stream; and means for transmitting a transmission comprising the plurality of pairs of space-time streams over a channel bandwidth in a frequency band above 45 Gigahertz (GHz).

Example 72 includes the subject matter of Example 71, and optionally, comprising means for mapping a first data sequence of a first spatial stream to a first symbol in a first odd numbered space-time stream, mapping a second data sequence of the first spatial stream to a second symbol in the first odd numbered space-time stream, mapping a sign inverted complex conjugate of the second data sequence of the first spatial stream to a first symbol in a first even numbered space-time stream, mapping a complex conjugate of the first data sequence of the first spatial stream to a second symbol in the first even numbered space-time stream, mapping a first data sequence of a second spatial stream to a first symbol in a second odd numbered space-time stream, mapping a second data sequence of the second spatial stream to a second symbol in the second odd numbered space-time stream, mapping a sign inverted complex conjugate of the second data sequence of the second spatial stream to a first symbol in a second even numbered space-time stream, and mapping a complex conjugate of the first data sequence of the second spatial stream to a second symbol in the second even numbered space-time stream.

Example 73 includes the subject matter of Example 71 or 72, and optionally, wherein the first data sequence of the spatial stream comprises a first sequence of data constellation points, the second data sequence of the spatial stream comprises a second sequence of data constellation points subsequent to the first sequence of data constellation points, the second symbol in the odd numbered space-time stream is subsequent to the first symbol in the odd numbered space-time stream, and the second symbol in the even numbered space-time stream is subsequent to the first symbol in the even numbered space-time stream.

Example 74 includes the subject matter of any one of Examples 71-73, and optionally, wherein the transmission comprises a Single Carrier (SC) transmission, the first data sequence comprises a first data symbol block comprising a first sequence of data constellation points, the second data sequence comprises a second data symbol block comprising a second sequence of data constellation points.

Example 75 includes the subject matter of Example 74, and optionally, comprising means for mapping a complex conjugate of a first inverted data symbol block to the second symbol in the even numbered space-time stream, and mapping a sign inverted complex conjugate of a second inverted data symbol block to the first symbol in the even numbered space-time stream, the first inverted data symbol block comprising the first data symbol block with inverted symbol order, the second inverted data symbol block comprising the second data symbol block with inverted symbol order.

Example 76 includes the subject matter of Example 74 or 75, and optionally, comprising means for mapping first and second spatial streams to first and second pairs of space-time streams as follows:

$$s^{iSTS=1} = (d^{(iss=1,0)}, d^{(iss=1,1)}, d^{(iss=1,2)},$$
$$d^{(iss=1,3)}, \ldots, d^{(iss=1,N_{BLKS}-2)}, d^{(iss=1,N_{BLKS}-1)})$$

$$s^{iSTS=2} = \begin{pmatrix} -conj(d_{inv}^{(iss=1,1)}), conj(d_{inv}^{(iss=1,0)}), -conj(d_{inv}^{(iss=1,3)}), \\ conj(d_{inv}^{(iss=1,2)}), \ldots, -conj(d_{inv}^{(iss=1,N_{BLKS}-1)}), conj(d_{inv}^{(iss=1,N_{BLKS}-2)}) \end{pmatrix}$$

$$s^{iSTS=3} = (d^{(iss=2,0)}, d^{(iss=2,1)}, d^{(iss=2,2)}, d^{(iss=2,3)},$$
$$\ldots, d^{(iss=2,N_{BLKS}-2)}, d^{(iss=2,N_{BLKS}-1)})$$

$$s^{iSTS=4} = \begin{pmatrix} -conj(d_{inv}^{(iss=2,1)}), conj(d_{inv}^{(iss=2,0)}), -conj(d_{inv}^{(iss=2,3)}), \\ conj(d_{inv}^{(iss=2,2)}), \ldots, -conj(d_{inv}^{(iss=2,N_{BLKS}-1)}), conj(d_{inv}^{(iss=2,N_{BLKS}-2)}) \end{pmatrix}$$

wherein:

$s^{iSTS}$ denotes modulated data symbols for a space-time stream with a space-time stream index $i_{sts}$, $i_{SS}$ denotes a spatial stream index;

$d^{(iss,q)}$ denotes a data symbol block with an index q in a spatial stream with the index $i_{SS}$;

$d_{inv}^{(iss,q)}$ denotes the data symbol block $d^{(iss,q)}$ with inverted symbol order; and $N_{BLKS}$ denotes a count of data symbol blocks.

Example 77 includes the subject matter of any one of Examples 71-73, and optionally, wherein the transmission comprises an Orthogonal Frequency Division Multiplexing (OFDM) transmission, the first data sequence comprises a first sequence of data constellation points, the second data sequence comprises a second sequence of data constellation points.

Example 78 includes the subject matter of Example 77, and optionally, comprising means for mapping the first sequence of data constellation points to a plurality of data subcarriers of a first OFDM symbol in the odd numbered space-time stream, mapping the second sequence of data constellation points to a plurality of data subcarriers of a second OFDM symbol in the odd numbered space-time stream, mapping a sign inverted complex conjugate of the second sequence of data constellation points to the plurality of subcarriers of the first OFDM symbol in the even numbered space-time stream, and mapping a complex conjugate of the first sequence of data constellation points to the plurality of subcarriers of the second OFDM symbol in the even numbered space-time stream.

Example 79 includes the subject matter of Example 77 or 78, and optionally, comprising means for mapping first and second spatial streams to first and second pairs of space-time streams as follows:

$$D(i_{STS}=1,2n,M_d(k))=d(i_{SS}=1,2n,k)$$

$$D(i_{STS}=1,2n+1,M_d(k))=d(i_{SS}=1,2n+1,k)$$

$$D(i_{STS}=2,2n,M_d(k))=-\text{conj}(d(i_{SS}=1,2n+1,k))$$

$$D(i_{STS}=2,2n+1,M_d(k))=\text{conj}(d(i_{SS}=1,2n,k))$$

$$D(i_{STS}=3,2n,M_d(k))=d(i_{SS}=2,2n,k)$$

$$D(i_{STS}=3,2n+1,M_d(k))=d(i_{SS}=2,2n+1,k)$$

$$D(i_{STS}=4,2n,M_d(k))=-\text{conj}(d(i_{SS}=2,2n+1,k))$$

$$D(i_{STS}=4,2n+1,M_d(k))=\text{conj}(d(i_{SS}=2,2n,k))$$

wherein:
$i_{SS}$ denotes a spatial stream index;
n=0, 1, . . . , $N_{SYM}/2-1$, $N_{SYM}$ denotes a number of symbols;
k=0, 1, . . . , $N_{SD}-1$, $N_{SD}$ denotes a number of data subcarriers;
$d(i_{SS},q,k)$ denotes a data constellation point for a q-th symbol and a k-th data tone for the spatial stream index $i_{ss}$; and
$D(i_{STS},q,M_d(k))$ denotes an element in a modulated data sequence for a space-time stream index $i_{sts}$ corresponding to the q-th symbol and a k-th modulated data tone Md(k).

Example 80 includes the subject matter of any one of Examples 77-79, and optionally, comprising means for mapping a plurality of pilot sequences to the plurality of pairs of space-time streams by mapping a first pilot sequence to a plurality of pilot subcarriers of the first OFDM symbol in the odd numbered space-time stream, mapping a second pilot sequence to a plurality of pilot subcarriers of the second OFDM symbol in the odd numbered space-time stream, mapping a sign inversion of the second pilot sequence to the plurality of pilot subcarriers of the first OFDM symbol in the even numbered space-time stream, and mapping the first pilot sequence to the plurality of pilot subcarriers of the second OFDM symbol in the even numbered space-time stream.

Example 81 includes the subject matter of Example 80, and optionally, comprising means for mapping the first and second pilot sequences to first and second pairs of space-time streams as follows:

$$P(i_{STS}=1,2n,M_p(k))=P_{NSP}(i_{STS}=1,k)\cdot(2p(2n)-1)$$

$$P(i_{STS}=1,2n+1,M_p(k))=P_{NSP}(i_{STS}=2,k)\cdot(2p(2n+1)-1)$$

$$P(i_{STS}=2,2n,M_p(k))=-P_{NSP}(i_{STS}=2,k)\cdot(2p(2n)-1)$$

$$P(i_{STS}=2,2n+1,M_p(k))=P_{NSP}(i_{STS}=1,k)\cdot(2p(2n+1)-1)$$

$$P(i_{STS}=3,2n,M_p(k))=P_{NSP}(i_{STS}=1,k)\cdot(2p(2n)-1)$$

$$P(i_{STS}=3,2n+1,M_p(k))=P_{NSP}(i_{STS}=2,k)\cdot(2p(2n+1)-1)$$

$$P(i_{STS}=4,2n,M_p(k))=-P_{NSP}(i_{STS}=2,k)\cdot(2p(2n)-1)$$

$$P(i_{STS}=4,2n+1,M_p(k))=P_{NSP}(i_{STS}=1,k)\cdot(2p(2n+1)-1)$$

wherein:
$i_{SS}$ denotes a spatial stream index;
n=0, 1, . . . , $N_{SYM}/2-1$, $N_{SYM}$ denotes a number of symbols;
k=0, 1, . . . , $N_{SP}-1$, $N_{SP}$ denotes a number of pilot subcarriers;
$P_{NSP}(i_{STS}, k)$ denotes a pilot sequence for a space-time stream index $i_{sts}$;
p(n) denotes an n-th scrambler bit; and
$P(i_{STS},q,M_p(k))$ denotes an element in a modulated pilot sequence for the space-time stream index $i_{sts}$ corresponding to the q-th symbol and a k-th modulated pilot tone Mp(k).

Example 82 includes the subject matter of any one of Examples 71-81, and optionally, wherein the channel bandwidth comprises an aggregated channel bandwidth.

Example 83 includes the subject matter of Example 82, and optionally, comprising means for transmitting a first pair of space-time streams over a first channel in the aggregated channel bandwidth, and transmitting a second pair of space-time streams over a second channel in the aggregated channel bandwidth.

Example 84 includes the subject matter of Example 83, and optionally, wherein the first channel comprises a 2.16 GHz primary channel, and the second channel comprises at least one 2.16 GHz secondary channel.

Example 85 includes the subject matter of any one of Examples 71-84, and optionally, wherein the channel bandwidth comprises a 2.16+2.16 GHz aggregated channel bandwidth, or a 4.32+4.32 GHz aggregated channel bandwidth.

Example 86 includes the subject matter of any one of Examples 71-85, and optionally, wherein the EDMG PPDU comprises an EDMG Single User (SU) PPDU.

Example 87 includes the subject matter of any one of Examples 71-85, and optionally, wherein the EDMG PPDU comprises an EDMG Multi User (MU) PPDU.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:
1. An apparatus comprising:
a processor comprising logic and circuitry configured to cause an Enhanced Directional Multi-Gigabit (DMG) (EDMG) wireless communication station (STA) to:
generate a plurality of spatial streams of an EDMG Physical Layer (PHY) Protocol Data Unit (PPDU);
map the plurality of spatial streams to a respective plurality of pairs of space-time streams according to a Space Time Block Coding (STBC) scheme by mapping data symbol blocks of a spatial stream of the plurality of spatial streams to a pair of space-time streams of the plurality of pairs of space-time streams, wherein a first symbol in an odd numbered space-time stream of the pair of space-time streams comprises a first data symbol block of the spatial stream, a second symbol in the odd numbered space-time stream comprises a second data symbol block of the spatial stream, a first symbol in an even numbered space-time stream of the pair of space-time streams comprises a sign-inverted complex conjugate of the second data symbol block with inverted symbol order, and a second symbol in the even numbered space-time stream comprises a complex conjugate of the first data symbol block with inverted symbol order; and transmit a Single Carrier (SC) transmission of the EDMG PPDU over a channel bandwidth in a frequency band above 45 Gigahertz (GHz), the SC transmission based on the plurality of pairs of space-time streams; and a memory to store information processed by the processor.

2. The apparatus of claim 1 configured to cause the EDMG STA to map a first spatial stream of the plurality of spatial streams to a first pair of space-time streams, and to map a second spatial stream of the plurality of spatial streams to a second pair of space-time streams, wherein:

a first symbol in an odd numbered space-time stream of the first pair of space-time streams comprises a first data symbol block of the first spatial stream, a second symbol in the odd numbered space-time stream of the first pair of space-time streams comprises a second data symbol block of the first spatial stream, a first symbol in an even numbered space-time stream of the first pair of space-time streams comprises a sign-inverted complex conjugate of the second data symbol block of the first spatial stream with inverted symbol order, a second symbol in the even numbered space-time stream of the first pair of space-time streams comprises a complex conjugate of the first data symbol block of the first spatial stream with inverted symbol order, a first symbol in an odd numbered space-time stream of the second pair of space-time streams comprises a first data symbol block of the second spatial stream, a second symbol in the odd numbered space-time stream of the second pair of space-time streams comprises a second data symbol block of the second spatial stream, a first symbol in an even numbered space-time stream of the second pair of space-time streams comprises a sign-inverted complex conjugate of the second data symbol block of the second spatial stream with inverted symbol order, and a second symbol in the even numbered space-time stream of the second pair of space-time streams comprises a complex conjugate of the first data symbol block of the second spatial stream with inverted symbol order.

3. The apparatus of claim 1, wherein the second data symbol block of the spatial stream is subsequent to the first data symbol block of the spatial stream, the second symbol in the odd numbered space-time stream is subsequent to the first symbol in the odd numbered space-time stream, and the second symbol in the even numbered space-time stream is subsequent to the first symbol in the even numbered space-time stream.

4. The apparatus of claim 1, wherein the first data symbol block of the spatial stream comprises a first sequence of data constellation points in the spatial stream, and the second data symbol block of the spatial stream comprises a second sequence of data constellation points in the spatial stream.

5. The apparatus of claim 1 configured to cause the EDMG STA to map first and second spatial streams to first and second pairs of space-time streams as follows:

$$s^{i_{STS}=1} = (d^{(i_{ss}=1,0)}, d^{(i_{ss}=1,1)}, d^{(i_{ss}=1,2)},$$
$$d^{(i_{ss}=1,3)}, \ldots, d^{(i_{ss}=1,N_{BLKS}-2)}, d^{(i_{ss}=1,N_{BLKS}-1)})$$

$$s^{i_{STS}=2} =$$
$$\begin{pmatrix} -conj(d_{inv}^{(i_{ss}=1,1)}), conj(d_{inv}^{(i_{ss}=1,0)}), -conj(d_{inv}^{(i_{ss}=1,3)}), \\ conj(d_{inv}^{(i_{ss}=1,2)}), \ldots, -conj(d_{inv}^{(i_{ss}=1,N_{BLKS}-1)}), conj(d_{inv}^{(i_{ss}=1,N_{BLKS}-2)}) \end{pmatrix}$$

$$s^{i_{STS}=3} = (d^{(i_{ss}=2,0)}, d^{(i_{ss}=2,1)}, d^{(i_{ss}=2,2)}, d^{(i_{ss}=2,3)},$$
$$\ldots, d^{(i_{ss}=2,N_{BLKS}-2)}, d^{(i_{ss}=2,N_{BLKS}-1)})$$

$$s^{i_{STS}=4} =$$
$$\begin{pmatrix} -conj(d_{inv}^{(i_{ss}=2,1)}), conj(d_{inv}^{(i_{ss}=2,0)}), -conj(d_{inv}^{(i_{ss}=2,3)}), \\ conj(d_{inv}^{(i_{ss}=2,2)}), \ldots, -conj(d_{inv}^{(i_{ss}=2,N_{BLKS}-1)}), conj(d_{inv}^{(i_{ss}=2,N_{BLKS}-2)}) \end{pmatrix}$$

wherein:

$s^{i_{STS}}$ denotes modulated data symbols for a space-time stream with a space-time stream index $i_{sts}$, $i_{ss}$ denotes a spatial stream index;

$d^{(i_{ss},q)}$ denotes a data symbol block with an index q in a spatial stream with the index $i_{ss}$;

$d_{inv}^{(i_{ss},q)}$ denotes the data symbol block $d^{(i_{ss},q)}$ with inverted symbol order; and $N_{BLKS}$ denotes a count of data symbol blocks.

6. The apparatus of claim 1, wherein the channel bandwidth comprises a 2.16+2.16 GHz channel bandwidth, or a 4.32+4.32 GHz channel bandwidth.

7. The apparatus of claim 1, wherein the EDMG PPDU comprises an EDMG Single User (SU) PPDU.

8. The apparatus of claim 1, wherein the EDMG PPDU comprises an EDMG Multi User (MU) PPDU.

9. The apparatus of claim 1 comprising a radio, the processor configured to cause the radio to transmit the SC transmission.

10. The apparatus of claim 9 comprising one or more antennas connected to the radio, and another processor to execute instructions of an Operating System (OS).

11. A product comprising one or more tangible computer-readable non-transitory storage media comprising computer-executable instructions operable to, when executed by at least one processor, enable the at least one processor to cause an Enhanced Directional Multi-Gigabit (DMG) (EDMG) wireless communication station (STA) to:

generate a plurality of spatial streams of an EDMG Physical Layer (PHY) Protocol Data Unit (PPDU);

map the plurality of spatial streams to a respective plurality of pairs of space-time streams according to a Space Time Block Coding (STBC) scheme by mapping data symbol blocks of a spatial stream of the plurality of spatial streams to a pair of space-time streams of the plurality of pairs of space-time streams, wherein a first symbol in an odd numbered space-time stream of the pair of space-time streams comprises a first data symbol block of the spatial stream, a second symbol in the odd numbered space-time stream comprises a second data symbol block of the spatial stream, a first symbol in an even numbered space-time stream of the pair of space-time streams comprises a sign-inverted complex conjugate of the second data symbol block with inverted symbol order, and a second symbol in the even numbered space-time stream comprises a complex conjugate of the first data symbol block with inverted symbol order; and transmit a Single Carrier (SC) transmission of the EDMG PPDU over a channel bandwidth in a frequency band above 45 Gigahertz (GHz), the SC transmission based on the plurality of pairs of space-time streams.

12. The product of claim 11, wherein the instructions, when executed, cause the EDMG STA to map a first spatial stream of the plurality of spatial streams to a first pair of space-time streams, and to map a second spatial stream of the plurality of spatial streams to a second pair of space-time streams, wherein:

a first symbol in an odd numbered space-time stream of the first pair of space-time streams comprises a first data symbol block of the first spatial stream, a second symbol in the odd numbered space-time stream of the first pair of space-time streams comprises a second data symbol block of the first spatial stream, a first symbol in an even numbered space-time stream of the first pair of space-time streams comprises a sign-inverted complex conjugate of the second data symbol block of the first spatial stream with inverted symbol order, a second symbol in the even numbered space-time stream of the first pair of space-time streams comprises a complex conjugate of the first data symbol block of the first spatial stream with inverted symbol order, a first symbol in an odd numbered space-time stream of the second pair of space-time streams comprises a first data symbol block of the second spatial stream, a second symbol in the odd numbered space-time stream of the second pair of space-time streams comprises a second data symbol block of the second spatial stream, a first symbol in an even numbered space-time stream of the second pair of space-time streams comprises a sign-inverted complex conjugate of the second data symbol block of the second spatial stream with inverted symbol order, and a second symbol in the even numbered space-time stream of the second pair of space-time streams comprises a complex conjugate of the first data symbol block of the second spatial stream with inverted symbol order.

13. The product of claim 11, wherein the second data symbol block of the spatial stream is subsequent to the first data symbol block of the spatial stream, the second symbol in the odd numbered space-time stream is subsequent to the first symbol in the odd numbered space-time stream, and the second symbol in the even numbered space-time stream is subsequent to the first symbol in the even numbered space-time stream.

14. The product of claim 11, wherein the first data symbol block of the spatial stream comprises a first sequence of data constellation points in the spatial stream, and the second data symbol block of the spatial stream comprises a second sequence of data constellation points in the spatial stream.

15. The product of claim 11, wherein the instructions, when executed, cause the EDMG STA to map first and second spatial streams to first and second pairs of space-time streams as follows:

$$S^{i_{STS}=1} = (d^{(i_{SS}=1,0)}, d^{(i_{SS}=1,1)}, d^{(i_{SS}=1,2)}, d^{(i_{SS}=1,3)}, \ldots ,$$
$$d^{(i_{SS}=1,N_{BLKS}-2)}, d^{(i_{SS}=1,N_{BLKS}-1)})$$

-continued $$S^{i_{STS}=2} = \begin{pmatrix} -conj(d_{inv}^{(i_{SS}=1,1)}), conj(d_{inv}^{(i_{SS}=1,0)}), -conj(d_{inv}^{(i_{SS}=1,3)}), \\ conj(d_{inv}^{(i_{SS}=1,2)}), \ldots , -conj(d_{inv}^{(i_{SS}=1,N_{BLKS}-1)}), \\ conj(d_{inv}^{(i_{SS}=1,N_{BLKS}-2)}) \end{pmatrix}$$

$$S^{i_{STS}=3} = (d^{(i_{SS}=2,0)}, d^{(i_{SS}=2,1)}, d^{(i_{SS}=2,2)}, d^{(i_{SS}=2,3)}, \ldots ,$$
$$d^{(i_{SS}=2,N_{BLKS}-2)}, d^{(i_{SS}=2,N_{BLKS}-1)})$$

$$S^{i_{STS}=4} = \begin{pmatrix} -conj(d_{inv}^{(i_{SS}=2,1)}), conj(d_{inv}^{(i_{SS}=2,0)}), -conj(d_{inv}^{(i_{SS}=2,3)}), \\ conj(d_{inv}^{(i_{SS}=2,2)}), \ldots , -conj(d_{inv}^{(i_{SS}=2,N_{BLKS}-1)}), \\ conj(d_{inv}^{(i_{SS}=2,N_{BLKS}-2)}) \end{pmatrix}$$

wherein:

$s^{i_{STS}}$ denotes modulated data symbols for a space-time stream with a space-time stream index $i_{sts}$, $i_{ss}$ denotes a spatial stream index;

$d^{(i_{ss},q)}$ denotes a data symbol block with an index q in a spatial stream with the index $i_{ss}$;

$d_{inv}^{(i_{ss},q)}$ denotes the data symbol block $d^{(i_{ss},q)}$ with inverted symbol order; and $N_{BLKS}$ denotes a count of data symbol blocks.

16. The product of claim 11, wherein the channel bandwidth comprises a 2.16+2.16 GHz channel bandwidth, or a 4.32+4.32 GHz channel bandwidth.

17. The product of claim 11, wherein the EDMG PPDU comprises an EDMG Single User (SU) PPDU.

18. The product of claim 11, wherein the EDMG PPDU comprises an EDMG Multi User (MU) PPDU.

19. An apparatus comprising:

means for generating at an Enhanced Directional Multi-Gigabit (DMG) (EDMG) wireless communication station (STA) a plurality of spatial streams of an EDMG Physical Layer (PHY) Protocol Data Unit (PPDU);

means for mapping the plurality of spatial streams to a respective plurality of pairs of space-time streams according to a Space Time Block Coding (STBC) scheme by mapping data symbol blocks of a spatial stream of the plurality of spatial streams to a pair of space-time streams of the plurality of pairs of space-time streams, wherein a first symbol in an odd numbered space-time stream of the pair of space-time streams comprises a first data symbol block of the spatial stream, a second symbol in the odd numbered space-time stream comprises a second data symbol block of the spatial stream, a first symbol in an even numbered space-time stream of the pair of space-time streams comprises a sign-inverted complex conjugate of the second data symbol block with inverted symbol order, and a second symbol in the even numbered space-time stream comprises a complex conjugate of the first data symbol block with inverted symbol order; and means for causing the EDMG STA to transmit a Single Carrier (SC) transmission of the EDMG PPDU over a channel bandwidth in a frequency band above 45 Gigahertz (GHz), the SC transmission based on the plurality of pairs of space-time streams.

20. The apparatus of claim 19 comprising means for mapping a first spatial stream of the plurality of spatial streams to a first pair of space-time streams, and mapping a second spatial stream of the plurality of spatial streams to a second pair of space-time streams, wherein:

a first symbol in an odd numbered space-time stream of the first pair of space-time streams comprises a first data symbol block of the first spatial stream,
a second symbol in the odd numbered space-time stream of the first pair of space-time streams comprises a second data symbol block of the first spatial stream,
a first symbol in an even numbered space-time stream of the first pair of space-time streams comprises a sign-inverted complex conjugate of the second data symbol block of the first spatial stream with inverted symbol order,
a second symbol in the even numbered space-time stream of the first pair of space-time streams comprises a complex conjugate of the first data symbol block of the first spatial stream with inverted symbol order,
a first symbol in an odd numbered space-time stream of the second pair of space-time streams comprises a first data symbol block of the second spatial stream,
a second symbol in the odd numbered space-time stream of the second pair of space-time streams comprises a second data symbol block of the second spatial stream,
a first symbol in an even numbered space-time stream of the second pair of space-time streams comprises a sign-inverted complex conjugate of the second data symbol block of the second spatial stream with inverted symbol order, and
a second symbol in the even numbered space-time stream of the second pair of space-time streams comprises a complex conjugate of the first data symbol block of the second spatial stream with inverted symbol order.

21. The apparatus of claim 19 comprising means mapping first and second spatial streams to first and second pairs of space-time streams as follows:

$$s^{i_{STS}=1} = (d^{(i_{SS}=1,0)}, d^{(i_{SS}=1,1)}, d^{(i_{SS}=1,2)}, d^{(i_{SS}=1,3)}, \ldots, d^{(i_{SS}=1,N_{BLKS}-2)}, d^{(i_{SS}=1,N_{BLKS}-1)})$$

$$s^{i_{STS}=2} = \begin{pmatrix} -conj(d_{inv}^{(i_{SS}=1,1)}), conj(d_{inv}^{(i_{SS}=1,0)}), -conj(d_{inv}^{(i_{SS}=1,3)}), \\ conj(d_{inv}^{(i_{SS}=1,2)}), \ldots, -conj(d_{inv}^{(i_{SS}=1,N_{BLKS}-1)}), \\ conj(d_{inv}^{(i_{SS}=1,N_{BLKS}-2)}) \end{pmatrix}$$

$$s^{i_{STS}=3} = (d^{(i_{SS}=2,0)}, d^{(i_{SS}=2,1)}, d^{(i_{SS}=2,2)}, d^{(i_{SS}=2,3)}, \ldots, d^{(i_{SS}=2,N_{BLKS}-2)}, d^{(i_{SS}=2,N_{BLKS}-1)})$$

$$s^{i_{STS}=4} = \begin{pmatrix} -conj(d_{inv}^{(i_{SS}=2,1)}), conj(d_{inv}^{(i_{SS}=2,0)}), -conj(d_{inv}^{(i_{SS}=2,3)}), \\ conj(d_{inv}^{(i_{SS}=2,2)}), \ldots, -conj(d_{inv}^{(i_{SS}=2,N_{BLKS}-1)}), \\ conj(d_{inv}^{(i_{SS}=2,N_{BLKS}-2)}) \end{pmatrix}$$

wherein:
$s^{i_{STS}}$ denotes modulated data symbols for a space-time stream with a space-time stream index $i_{sts}$,
$i_{ss}$ denotes a spatial stream index;
$d^{(i_{ss},q)}$ denotes a data symbol block with an index q in a spatial stream with the index $i_{ss}$;
$d_{inv}^{(i_{ss},q)}$ denotes the data symbol block $d^{(i_{ss},q)}$ with inverted symbol order; and
$N_{BLKS}$ denotes a count of data symbol blocks.

* * * * *